United States Patent
Sakai

(10) Patent No.: US 9,274,376 B2
(45) Date of Patent: Mar. 1, 2016

(54) LIQUID CRYSTAL DISPLAY DEVICE

(75) Inventor: Akira Sakai, Osaka (JP)

(73) Assignee: SHARP KABUSHIKI KAISHA, Osaka-shi, Osaka (JP)

( * ) Notice: Subject to any disclaimer, the term of this patent is extended or adjusted under 35 U.S.C. 154(b) by 234 days.

(21) Appl. No.: 14/008,660

(22) PCT Filed: Mar. 23, 2012

(86) PCT No.: PCT/JP2012/057431
§ 371 (c)(1),
(2), (4) Date: Sep. 30, 2013

(87) PCT Pub. No.: WO2012/133137
PCT Pub. Date: Oct. 4, 2012

(65) Prior Publication Data
US 2014/0218668 A1    Aug. 7, 2014

(30) Foreign Application Priority Data
Mar. 31, 2011   (JP) ................. 2011-080126

(51) Int. Cl.
*G02F 1/1335*      (2006.01)
*G02F 1/13363*     (2006.01)
(Continued)

(52) U.S. Cl.
CPC ........ *G02F 1/133634* (2013.01); *G02B 5/3083* (2013.01); *G02B 27/286* (2013.01);
(Continued)

(58) Field of Classification Search
CPC .......... G02F 1/13363; G02F 1/133634; G02F 2001/133742; G02F 2413/03; G02F 2413/05; G02F 2413/04; G02F 1/133502; G02F 2001/133541; G02F 2001/133638; G02B 27/286; G02B 5/3083

USPC .................................................. 349/117–120
See application file for complete search history.

(56) References Cited

U.S. PATENT DOCUMENTS 8,237,901 B2 *  8/2012  Kisara et al. .................. 349/119
8,331,025 B2 * 12/2012  Kobayashi et al. ...... 359/489.07
(Continued)

FOREIGN PATENT DOCUMENTS

JP      2002-040428        2/2002
JP      2003-186017        7/2003
(Continued)

OTHER PUBLICATIONS

"Crystal Optics", *Morikita Publication*, 1975, pp. 146-163.
(Continued)

*Primary Examiner* — Hoan C Nguyen
(74) *Attorney, Agent, or Firm* — Nixon & Vanderhye, P.C.

(57) ABSTRACT

The present invention provides a liquid crystal display device which enables costs to be reduced, excels in productivity, and enables a high contrast ratio over a wide viewing angle range to be realized. The present invention is a liquid crystal display device including a first polarizer, a second-type (nx<ny≤nz) birefringent layer, a first λ/4 plate (nx>ny≥nz), a liquid crystal cell, a second λ/4 plate having an Nz coefficient different from the first λ/4, and a second polarizer in this order, wherein an in-plane slow axis of the first λ/4 plate forms generally 45 degrees as to an absorption axis of the first polarizer, an in-plane slow axis of the second λ/4 plate is generally orthogonal to the in-plane slow axis of the first λ/4 plate, an absorption axis of the second polarizer is orthogonal to the absorption axis of the first polarizer, an in-plane fast axis of the second-type birefringent layer is generally orthogonal to the absorption axis of the first polarizer, and black display is performed by aligning liquid crystal molecules within a liquid crystal layer in a manner generally perpendicular to substrate faces.

10 Claims, 13 Drawing Sheets

(51) Int. Cl.
*G02B 5/30* (2006.01)
*G02B 27/28* (2006.01)
*G02F 1/1337* (2006.01)

(52) U.S. Cl.
CPC ...... *G02F1/13363* (2013.01); *G02F 1/133502* (2013.01); *G02F 2001/133541* (2013.01); *G02F 2001/133638* (2013.01); *G02F 2001/133742* (2013.01); *G02F 2202/36* (2013.01); *G02F 2413/03* (2013.01); *G02F 2413/04* (2013.01); *G02F 2413/05* (2013.01)

(56) References Cited

U.S. PATENT DOCUMENTS

| | | |
|---|---|---|
| 2003/0071952 A1 | 4/2003 | Yoshida et al. |
| 2007/0159585 A1 | 7/2007 | Yoshida et al. |
| 2009/0002580 A1* | 1/2009 | Matsushima et al. ........... 349/12 |
| 2009/0207355 A1 | 8/2009 | Yanai et al. |
| 2009/0279030 A1* | 11/2009 | Toyama et al. ............... 349/117 |
| 2010/0289988 A1 | 11/2010 | Sakai et al. |
| 2011/0025966 A1 | 2/2011 | Sakai |
| 2011/0170041 A1 | 7/2011 | Sakai |
| 2011/0181814 A1 | 7/2011 | Sakai |
| 2011/0261297 A1 | 10/2011 | Yoshida et al. |
| 2012/0120349 A1* | 5/2012 | Sakai .............................. 349/96 |
| 2012/0188492 A1 | 7/2012 | Sakai |
| 2013/0010221 A1 | 1/2013 | Yoshida et al. |

FOREIGN PATENT DOCUMENTS

| | | |
|---|---|---|
| JP | 2003-207782 | 7/2003 |
| JP | 2008-146003 | 6/2008 |
| JP | 2009-037049 | 2/2009 |
| JP | 2009-223279 | 10/2009 |
| WO | WO 2009/125515 | 10/2009 |
| WO | WO 2010/087058 | 8/2010 |
| WO | WO 2010/137372 | 12/2010 |
| WO | WO 2011/013399 | 2/2011 |

OTHER PUBLICATIONS

Ge et al., "Wide-View Circular Polarizers for Mobile Liquid Crystal Displays", *IDRC'08*, 2008, pp. 266-268.

Hirota et al., "Retardation Films with In-Plane Oblique Slow-Axis", *IDW'08*, 2008, pp. 1733-1736.

International Search Report for PCT/JP2012/057431, mailed Jun. 19, 2012.

* cited by examiner

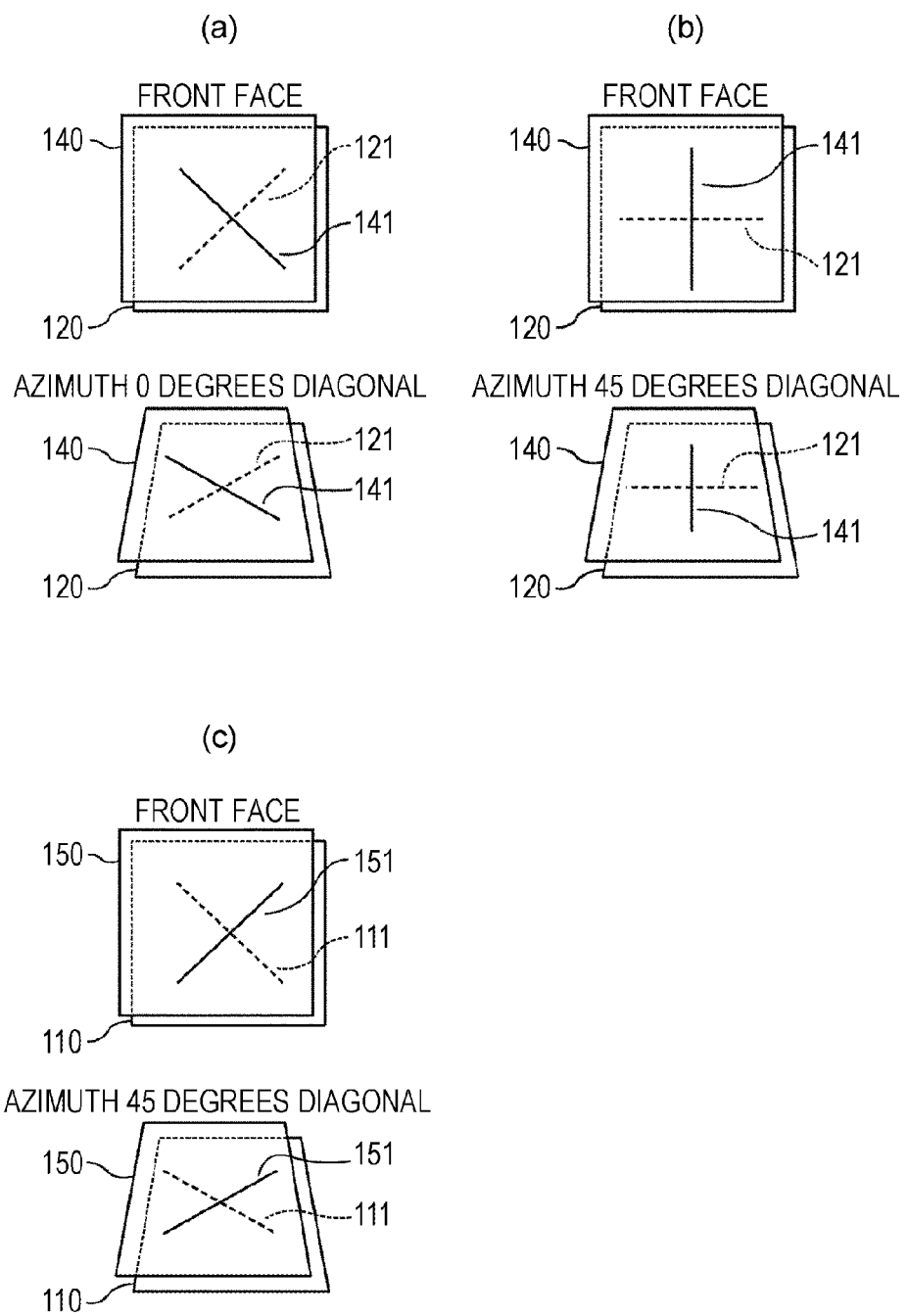

LIQUID CRYSTAL DISPLAY DEVICE

This application is the U.S. national phase of International Application No. PCT/JP2012/057431 filed 23 Mar. 2012 which designated the U.S. and claims priority to JP 2011-080126 filed 31 Mar. 2011, the entire contents of each of which are hereby incorporated by reference.

TECHNICAL FIELD

The present invention relates to a liquid crystal display device, and more specifically relates to a VA (Vertical Alignment) mode liquid crystal display device employing a circularly-polarizing plate.

BACKGROUND ART

Liquid crystal display devices have widely been employed as display devices of various information processing apparatuses including computers and televisions. In particular, TFT type liquid crystal display devices (hereinafter, also referred to as "TFT-LCD") have come into widespread use, and further market growth is anticipated, leading to demand for further improvement in image quality. Hereinafter, description will be made with a TFT-LCD as an example, but the present invention is not restricted to this, and is applicable to liquid crystal display devices in general, and is applicable to, for example, passive-matrix liquid crystal display devices and plasma address liquid crystal display devices.

A system most widely heretofore employed in TFT-LCD has been a so-called TN (Twisted Nematic) mode wherein liquid crystals having positive dielectric anisotropy are horizontally aligned between substrates which face each other. Liquid crystal display devices according to the TN mode are characterized in that the alignment directions of adjacent liquid crystal molecules in one of the substrates are twisted 90 degrees as to the alignment directions of adjacent liquid crystal molecules in the other substrate. With such a TN mode liquid crystal display device, inexpensive manufacturing technology has been established, and industrially matured, but it has been difficult to realize a high contrast ratio.

On the other hand, there have been known liquid crystal display devices of a so-called VA mode wherein liquid crystals having negative dielectric anisotropy are vertically aligned between substrates which face each other. With the VA mode liquid crystal display devices, liquid crystal molecules are aligned in a direction generally perpendicular to the substrate faces when voltage is not applied, and accordingly, liquid crystal cells hardly exhibit any birefringence and optical rotation, so light passes through the liquid crystal cell with little change in the polarization state thereof. Accordingly, a pair of polarizers (linear polarizers) are disposed upward and downward of the liquid crystal cell so that absorption axes thereof are mutually orthogonal (hereinafter, also referred to as "Cross Nicol polarizer"), whereby substantially complete black display can be realized when no voltage is applied. When voltage equal to or larger than a threshold voltage is applied (hereinafter, simply abbreviated as "when voltage is applied"), liquid crystal molecules are inclined so as to be generally in parallel to the substrates, and exhibit large birefringence, so white display can be realized. Accordingly, such VA mode liquid crystal display devices can readily realize a very high contrast ratio.

With such a VA mode liquid crystal display device, when the inclination directions of liquid crystal molecules when voltage is applied are one direction, asymmetry occurs in the viewing angle property of the liquid crystal display device. Accordingly, an alignment division type VA mode, which is a so-called MVA mode (multi-domain type VA mode), is widely employed wherein the inclination directions of liquid crystal molecules are divided into multiple directions within a pixel, using architectural devising for pixel electrodes, or methods for providing alignment control means such as protrusions or the like within a pixel.

In the MVA mode, from the perspective of maximizing transmittance in a white display state, design is ordinarily made so that the axial direction of the polarizer and the inclination directions of liquid crystal molecules form an angle of 45 degrees. This is because transmittance when sandwiching a birefringent medium between Cross Nicol polarizers is proportional to $\sin^2(2\alpha)$ when assuming that an angle that the axis of a polarizer and the slow axis of the birefringent medium form is $\alpha$ (units: rad). In a typical MVA mode, the inclination azimuthal directions of liquid crystal molecules may be divided into four domains of 45 degrees, 135 degrees, 225 degrees, and 315 degrees. Even in such an MVA mode wherein the inclination directions of liquid crystal molecules have been divided into four domains, Schlieren texture or alignment to an unintentional direction has frequently been observed at boundaries between domains or in the vicinity of alignment control means, causing transmittance loss.

In order to solve such a problem, a VA mode liquid crystal display device employing a circularly-polarizing plate has been studied (e.g., see PTL 1). According to such a liquid crystal display device, transmittance when sandwiching a birefringent medium between mutually orthogonal right and left circularly-polarizing plates does not depend on the angle that the axis of the polarizer and the slow axis of the birefringent medium form, and accordingly, even when the inclination azimuthal directions of liquid crystal molecules are other than 45 degrees, 135 degrees, 225 degrees, and 315 degrees, if the inclinations of the liquid crystal molecules can be controlled, desired transmittance can be secured. Accordingly, for example, a circular protrusion may be disposed in the center of a pixel to incline liquid crystal molecules to all azimuthal directions, or liquid crystal molecules may be inclined to a random azimuthal direction without completely controlling the inclination azimuthal directions thereof. Note that, within the present Specification, the VA mode employing a circularly-polarizing plate will also be referred to as circularly-polarized VA mode or circularly-polarized mode. On the other hand, a VA mode employing a linearly-polarizing plate will also be referred to as linearly-polarized VA mode or linearly-polarized mode. Also, a circularly-polarizing plate is typically, as well known, configured of a combination of a linearly-polarizing plate and a $\lambda/4$ plate.

Further, circularly-polarized light has a property that left handedness and right handedness are switched at the time of being reflected at a mirror or the like, and accordingly, for example, when disposing a left circularly-polarizing plate on a mirror to input light thereinto, the light which has transmitted through the circularly-polarizing plate and been transformed into left handed circularly-polarized light is reflected at the mirror, the light is transformed into right handed circularly-polarized light, the right handed circularly-polarized light thereof cannot transmit through the left circularly-polarizing plate, and consequently, it has been known that the circularly-polarizing plate has an antireflection optical function. The antireflection optical function of such a circularly-polarizing plate can prevent unnecessary reflection in the event of observing a display device in a bright environment such as outdoor or the like, and accordingly, it has been known that there is an effect to improve contrast ratio in a bright environment of a display device such as a VA mode liquid crystal display device. Here, the unnecessary reflection is considered to be primarily reflection due to a transparent electrode or metal wiring of a TFT device, existing within a display device. Unless this unnecessary reflection is prevented, even with a display device which realizes generally complete black display in a dark room environment, light amount at the time of black display of the display device increases when observing in a bright environment, and consequently, the contrast ratio deteriorates.

As described above, in the circularly-polarized VA mode employing a circularly-polarizing plate, a transmittance improvement effect and an unnecessary reflection prevention effect can be obtained, but with a conventional circularly-polarized AV mode liquid crystal display device, there is room for improvement in that the contrast ratio in an oblique view angle is low, and sufficient viewing angle property is not obtained. To this end, various viewing angle property improvement techniques employing a birefringent layer (retardation film) have been proposed. For example, PTL 1 has disclosed the following (A) method, PTL 2 has disclosed the following (B) method, PTL 3 has disclosed the following (C) method, PTL 4 has disclosed the following (D) method, and NPL 1 has disclosed the following (E) method.

(A) Method employing two $\lambda/4$ plates satisfying a relation of $nx>ny>nz$ (B) Method employing a combination of two $\lambda/4$ plates satisfying a relation of $nx>ny>nz$ and one or two second-type birefringent layers satisfying a relation of $nx<ny\leq nz$ (C) Method employing a combination of two $\lambda/4$ plates satisfying a relation of $nx>nz>ny$ and a birefringent layer satisfying a relation of $nx=ny>nz$ (D) Method further employing a combination of one or two lambda/2 plates satisfying a relation of $nx>nz>ny$ in the method in (C)

(E) Method employing a combination of two uniaxial $\lambda/4$ plates (so-called A plate satisfying a relation of $nx>ny=nz$), and a birefringent layer satisfying a relation of $nx=ny>nz$, and a birefringent layer satisfying a relation of $nx>nz>ny$ However, there has still been room for improvement in the viewing angle property even with the above (A), (B), and (C) methods. Also, with the above (C), (D), and (E) methods, there has been room for improvement in that there is needed a biaxial retardation film satisfying a relation of $nx>nz>ny$ (satisfying a relation of $0<Nz<1$) which is difficult to be manufactured and high in costs.

Therefore, the present inventor has studied various ways to solve the above problem, and has proposed the following (F) method (see PTL 5).

(F) Method employing a combination of two $\lambda/4$ plates, a third-type birefringent layer satisfying a relation of $nx=ny>nz$, a first-type birefringent layer satisfying a relation of $nx>ny\geq nz$, and a second-type birefringent layer satisfying a relation of $nx<ny\leq nz$ However, with the above (F) method, improvement in the viewing angle property is realized by optimally designing Nz coefficients (parameters representing biaxiality) of the two $\lambda/4$ plates, but under a design condition employing two general-purpose biaxial $\lambda/4$ plates satisfying a relation of $nx>ny\geq nz$ ($Nz\geq 1.0$), there is room for improvement regarding the viewing angle property.

Therefore, as a result of further study, the present inventor has found that a circularly-polarized VA mode liquid crystal display device whereby a high contrast ratio can be obtained over a wide view angle range can readily be manufactured by taking two $\lambda/4$ plates (first and second $\lambda/4$ plates) as biaxial $\lambda/4$ plates satisfying a relation of $nx>ny\geq nz$, Nz coefficients thereof are adjusted to generally the same, and disposing a birefringent layer satisfying a relation of $nx<ny\leq nz$ at least between the first $\lambda/4$ plate and the first polarizer or between the second $\lambda/4$ and the second polarizer, and has previously filed a patent application of this (see PTL 6 and PTL 7).

Also, with regard to a circularly-polarizing plate manufacturing method, there has been disclosed a method for manufacturing a polarizing plate according to roll-to-roll lamination technology using a $\lambda/4$ plate having an in-plane slow axis in an oblique direction as to a flow direction (machine direction) (e.g., see NPL 2). According to this method, the Nz coefficient of the $\lambda/4$ plate can be controlled from 1.1 to 2.0.

CITATION LIST

Patent Literature

PTL 1: Japanese Unexamined Patent Application Publication No. 2002-40428
PTL 2: Japanese Unexamined Patent Application Publication No. 2009-37049
PTL 3: Japanese Unexamined Patent Application Publication No. 2003-207782
PTL 4: Japanese Unexamined Patent Application Publication No. 2003-186017
PTL 5: International Publication No. 2009/125515
PTL 6: International Publication No. 2010/087058
PTL 7: International Publication No. 2010/137372
PTL 8: Japanese Unexamined Patent Application Publication No. 2008-146003

Non Patent Literature

NPL 1: Zhibing Ge, and six others, "Wide-View Circular Polarizers for Mobile Liquid Crystal Displays", IDRC08, 2008, p. 266-268
NPL 2: M. Hirota, and four others, "Retardation Films with In-Plane Oblique Slow-Axis", IDW'08, 2008, p. 1733-1736
NPL 3: written by Hiroshi Takasaki, "Crystal Optics", Morikita publication, 1975, p. 146-163

SUMMARY OF INVENTION

Technical Problem

As described above, a circularly-polarizing plate is typically a combination of a linearly-polarizing plate and a $\lambda/4$ plate. In this case, an angle that the absorption axis of the linearly-polarizing plate and the in-plane slow axis of the $\lambda/4$ plate form suffices to be set to generally 45 degrees. Therefore, in recent years, from a perspective of improvement in productivity, as a circularly-polarizing plate manufacturing method, there has been developed a method for mutually gluing an obliquely-drawn $\lambda/4$ plate, uniaxially-drawn polarizer, and a protective film (e.g., TAC film) together using the roll-to-roll lamination technology. Also, a $\lambda/4$ plate of which the Nz coefficient has been set to approximate 1.6, and a circularly-polarizing plate including this $\lambda/4$ plate are offered commercially.

However, in the event that the Nz coefficient of the $\lambda/4$ plate is large, it has sometimes been difficult to manufacture a circularly-polarizing plate using the roll-to-roll lamination technology. For example, even with technology disclosed in NPL 2, it is difficult to manufacture a circularly-polarizing plate including a $\lambda/4$ plate having a larger Nz coefficient than 2.0. Accordingly, in the event that the Nz coefficient of the $\lambda/4$ plate is large, productivity of circularly-polarizing plates may deteriorate, increasing manufacturing costs. Also, in the event of manufacturing a circularly-polarizing plate including a λ/4 plate having a large Nz coefficient using the roll-to-roll lamination technology, quality thereof may also deteriorate.

With PTL 6 and PTL 7 as well, depending on conditions such as retardation of a liquid crystal layer, whether or not there is a third-type birefringent layer, retardation of the third-type birefringent layer, and so forth, the Nz coefficients of the first and second λ/4 plates may be set to a great value. In such a case, the Nz coefficients of the first and second λ/4 plates are mutually generally the same, and accordingly, with upper and lower two circularly-polarizing plates, deterioration in productivity, increase in manufacturing costs, and deterioration in quality may occur. For example, when manufacturing upper and lower two circularly-polarizing plates using batch processing (sheet processing), productivity markedly decreases. Also, deterioration in quality of a circularly-polarizing plate leads to deterioration in the viewing angle property of a circularly-polarized VA mode liquid crystal device.

Also, with technology in PTL 6 and PTL 7, in the event that no third-type birefringent layer is provided, compensation of a liquid crystal layer needs to be performed by adjusting the Nz coefficients of the first and second λ/4 plates. Further, various surface treatment layers are usually provided to a circularly-polarizing plate on the observation face side of a liquid crystal cell. Therefore, in the event that retardation of the liquid crystal layer has been changed, each of the upper and lower two circularly-polarizing plates has to be remanufactured according to the retardation value of the liquid crystal layer and the type of a surface treatment layer. This prevents mass production of a small number of varieties, which is inconvenient regarding both costs and productivity. Also, this may hinder mass production. Accordingly, with techniques of PTL 6 and PTL 7, there is room for improvement in that reduction in costs and improvement in productivity are realized. Note that, with the present Specification, a circularly-polarizing plate provided to the observation face side of the liquid crystal cell will also be referred to as an observation face side circularly-polarizing plate, and a circularly-polarizing plate provided to the rear face side of the liquid crystal cell will also be referred to as a rear-face side circularly-polarizing plate.

The present invention has been made in the light of the above current situations, and its object is to provide a liquid crystal display device which enables costs to be reduced, excels in productivity, and enables a high contrast ratio over a wide view angle range to be realized.

Solution to Problem

The present inventor has made various studies regarding a liquid crystal display device which enables costs to be reduced, excels in productivity, and enables a high contrast ratio over a wide view angle range to be realized, and has consequently focused on retardation conditions of a birefringent layer to be disposed between a pair of polarizers Cross Nicol disposed (first and second polarizers). The present inventor has found that, after assuming that two λ/4 plates (first and second λ/4 plates) are taken as biaxial λ/4 plates satisfying a relation of nx>ny≥nz (with the present Specification, "a birefringent layer satisfying a relation of nx>ny≥nz" is defined as a first-type birefringent layer), the Nz coefficients thereof are mutually changed, and a birefringent layer satisfying a relation of nx<ny≤nz (with the present Specification, "a birefringent layer satisfying a relation of nx<ny≤nz" is defined as a second-type birefringent layer) is disposed between the first λ/4 plate and the first polarizer, thereby enabling light leakage in a black display state to be reduced over a wide view angle range, and enabling a high contrast ratio to be realized. Also, the above first-type and second-type birefringent layers can be manufactured with a convenient way by employing a material having a suitable intrinsic birefringence different from a biaxial retardation film controlled so as to satisfy nx>nz>ny (0<Nz<1). Further, the present inventor has found that, even when a total of the Nz coefficients of the first and second λ/4 plate is set to a great value, a circularly-polarizing plate including a λ/4 plate having a smaller Nz coefficient can be manufactured using a highly productive method (e.g., a method employing the roll-to-roll lamination technology). Also, a commercially available circularly-polarizing plate can also be used as a circularly-polarizing plate including a λ/4 plate having a smaller Nz coefficient. The Nz coefficients of the first and second λ/4 plates can separately be adjusted, and accordingly, it has been found that design change such as change in the retardation of the liquid crystal layer, change in the type of the surface treatment layer, and so forth can flexibly be handled. More specifically, for example, in the event that the retardation of the liquid crystal layer has been changed, compensation of the liquid crystal layer can be performed by adjusting only the Nz coefficient of one of the λ/4 plates. Also, in such a case, only the Nz coefficient of one of the λ/4 plate is adjusted, and further, a third-type birefringent layer having suitable retardation is provided to the circularly-polarizing plate including the λ/4 plate thereof, whereby compensation of the liquid crystal layer can be performed. That is to say, design change of one of the circularly-polarizing plates is performed, whereby change in the retardation of the liquid crystal layer can be handled. As a result of the above, the present inventor has arrived in the present invention in the light of artfully solving the above problem.

Specifically, a certain aspect of the present invention is a liquid crystal display device including, when defining that a birefringent layer satisfying a relation of nx>ny≥nz is a first-type birefringent layer, and a birefringent layer satisfying a relation of nx<ny≤nz is a second-type birefringent layer: a first polarizer; a second-type birefringent layer; a first first-type birefringent layer of which the in-plane retardation has been adjusted to λ/4 (hereinafter, also referred to as "first λ/4 plate"); a liquid crystal cell having a pair of substrates which mutually face, and having a liquid crystal layer sandwiched between this pair of substrates; a second first-type birefringent layer having an Nz coefficient different from an Nz coefficient of the first first-type birefringent layer, of which the in-plane retardation has been adjusted to λ/4 (hereinafter, also referred to as "second λ/4 plate"); and a second polarizer in this order, with an in-plane slow axis of the first first-type birefringent layer forming an angle of generally 45 degrees as to an absorption axis of the first polarizer; with an in-plane slow axis of the second first-type birefringent layer being generally orthogonal to the in-plane slow axis of the first first-type birefringent layer; with an absorption axis of the second polarizer being generally orthogonal to the absorption axis of the first polarizer; with an in-plane fast axis of the second-type birefringent layer being generally orthogonal to the absorption axis of the first polarizer; and with black display being performed by aligning liquid crystal molecules within the liquid crystal layer in a manner generally perpendicular to the substrate surfaces (hereinafter, also referred to as "liquid crystal display device of the present invention").

"Polarizer" in the present Specification means an element having a function for transforming natural light (unpolarized light), partially-polarized light, or polarized light into linear polarized light, that is, extracting linear polarizer from natural light (unpolarized light), partially-polarized light, or polarized light, and has the same meaning as a polarizing film. Note that, with the present Specification, contrast of a polarizing plate including a polarizer does not necessarily have to be infinity, and may 5000 or higher (preferably 10000 or higher). "Birefringent layer" means a layer having optical anisotropy, and has the same meaning as a retardation film, retardation plate, optical anisotropy layer, birefringent medium, or the like. "Birefringent layer" in the present Specification means, from a perspective of sufficient manifestation of operational advances in the liquid crystal display device of the present invention, a layer having a value of 10 nm or more as at least one of the absolute values of later-described in-plane retardation R and later-described thickness direction retardation Rth, and preferably means a layer having a value of 20 nm or more. Also, as described above, with the present Specification, "first-type birefringent layer" means a birefringent layer satisfying a relation of $nx>ny\geq nz$, and "second-type birefringent layer" means a birefringent layer satisfying a relation of $nx<ny\leq nz$. nx and ny represent principal refractive indices in the in-plane direction as to light with wavelength of 550 nm, and nz represents a principal refractive index in the out-of-plane direction (thickness direction) as to light with wavelength of 550 nm. Further, an isotropic film means a film having a value of 10 nm or less as both of the absolute values of the in-plane retardation R and thickness direction retardation Rth, and preferably a film having a value of 5 nm or less.

"In-plane retardation R" in the present Specification is, when defining the principal refractive indices in the in-plane direction of a birefringent layer (including the liquid crystal cell and λ/4 plate) as nx and ny, and defining the principal refractive index in the out-of-plane direction (thickness direction) as nz, and defining the thickness of a birefringent layer as d, in-plane retardation (units: nm, absolute value) defined with $R=|nx-ny|\times d$. Correspondingly, "thickness direction retardation Rth" is out-of-plane (thickness direction) retardation (units: nm) defined with $Rth=(nz-(nx+ny)/2)\times d$. "λ/4 plate" or "birefringent layer with in-plane retardation being adjusted to λ/4 (including a first-type birefringent layer with in-plane retardation being adjusted to λ/4)" is a layer having optical anisotropy of generally ¼ wavelength (accurately 137.5 nm, but preferably longer than 115 nm but shorter than 160 nm) as to at least light wavelength of 550 nm, and has the same meaning as a λ/4 retardation film, and λ/4 retardation plate.

"In-plane slow axis (fast axis)" means, when redefining larger one of the above in-plane principal refractive indices nx and ny as ns, and smaller one as nf, a dielectric principal axial direction (x-axis or y-axis direction) corresponding to a principal refractive index ns (nf). Further, "Nz coefficient" is a parameter representing the degree of biaxial of a birefringent layer defined with $Nz=(ns-nz)/(ns-nf)$. Note that, unless otherwise noted, within the present Specification, the measured wavelength of a principal refractive index or retardation shall be 550 nm. Also, even with birefringent layers having the same Nz coefficient, when the mean refractive indices of the birefringent layers=$(nx+ny+nz)/3$ differ, effective retardations of the birefringent layers differ as to incidence from an oblique direction due to influence of a refracting angle, which complicates design guidelines. In order to avoid this problem, with the present Specification, unless otherwise noted, Nz coefficients are computed by unifying the mean refractive index of each birefringent layer into 1.5. With regard to a birefringent layer having an actual mean refractive index different from 1.5 as well, conversion is performed assuming a mean refractive index of 1.5. Also, the same handling is performed on the thickness direction retardation Rth.

With the present Specification, "the Nz coefficient of the first first-type birefringent layer and the Nz coefficient of the second first-type birefringent layer differ" represents a case where difference of the Nz coefficients is equal to or greater than 0.1, which is preferably equal to or greater than 0.3. "The in-plane slow axis of the first first-type birefringent layer and the absorption axis of the first polarizer form an angle of generally 45 degrees", that is, "the in-plane slow axis of the first first-type birefringent layer forms an angle of generally 45 degrees as to the absorption axis of the first polarizer" means that an angle that the in-plane slow axis of the first first-type birefringent layer and the absorption axis of the first polarizer form suffices to be 40 to 50 degrees, and preferably 45 degrees. Even in the event that a relative angle between the in-plane slow axis of the first first-type birefringent layer and the absorption axis of the first polarizer is not complete 45 degrees, the in-plane slow axis of the first first-type birefringent layer and the in-plane slow axis of the second first-type birefringent layer are generally orthogonal, whereby sufficient prevention effects are obtained regarding light leakage in a normal direction as to the substrate faces. On the other hand, from a perspective of reflection prevention function and improvement in transmittance, the above relative angle is 45 degrees, whereby a marked advantage is obtained. "The in-plane slow axis of the first first-type birefringent layer and the in-plane slow axis of the second first-type birefringent layer are generally orthogonal" means that an angle that the in-plane slow axis of the second first-type birefringent layer and the in-plane slow axis of the first first-type birefringent layer form suffices to be 88 to 92 degrees, and preferably 90 degrees. "The absorption axis of the second polarizer is generally orthogonal to the absorption axis of the first polarizer" means that an angle that the absorption axis of the second polarizer and the absorption axis of the first polarizer form suffices to be 88 to 92 degrees, and in particular preferably 90 degrees. "The in-plane fast axis of the second-type birefringent layer is generally orthogonal to the absorption axis of the first polarizer" means that an angle that the in-plane fast axis of the second-type birefringent layer and the absorption axis of the first polarizer form suffices to be 88 to 92 degrees, and preferably 90 degrees.

As long as the liquid crystal display device of the present invention includes the above first polarizer, second-type birefringent layer, first first-type birefringent layer, liquid crystal cell, second first-type birefringent layer, and second polarizer as components, the liquid crystal display device of the present invention is not particularly restricted to other members thereof. From a perspective of realizing change in a polarization state of later-described display light in the liquid crystal display device of the present invention in a sure manner, examples of a preferable mode of the liquid crystal display device of the present invention include a mode wherein no birefringent medium is included between the first polarizer and the second polarizer in addition to the above second-type birefringent layer, first first-type birefringent layer, liquid crystal cell, and second first-type birefringent layer. Also, from a perspective of reducing costs by reducing the number of birefringent layers to be used for the liquid crystal display device, examples of a more preferable mode of the liquid crystal display device of the present invention include a mode wherein no birefringent medium is included in the liquid crystal display device in addition to the above first polarizer, second-type birefringent layer, first first-type birefringent layer, liquid crystal cell, second first-type birefringent layer, and second polarizer. On the other hand, a birefringent medium may be added within the liquid crystal display device in addition to the above first polarizer, second-type birefringent layer, first first-type birefringent layer, liquid crystal cell, second first-type birefringent layer, and second polarizer, and for example, in order to adjust wavelength dispersibility of a birefringent layer or the like, a lambda/2 plate of which the in-plane retardation has been adjusted to lambda/2 may be added within the liquid crystal display device.

Also, the present inventor has found that causes hindering complete black display differ depending on azimuthal directions, and has found that retardation compensation as to multiple azimuthal directions can be performed by disposing a birefringent layer satisfying a relation of nx≈ny>nz (with the present Specification, "birefringent layer satisfying a relation of nx≈ny>nz" will be defined as a third-type birefringent layer) between the first and second λ/4 plates. With a mode where a third-type birefringent layer is provided, first, the retardation value of the third-type birefringent layer is adjusted, whereby a retardation compensation condition in the azimuthal direction 0 degree can be optimized, and next, the retardation value of the second-type birefringent layer is suitably disposed, and accordingly, a retardation compensation condition in the azimuthal direction 45 degrees is optimized without changing the optimal condition of the retardation compensation in the azimuthal direction 0 degrees, whereby light leakage in a black display state in an oblique direction can be reduced over a wider azimuthal direction. As a result thereof, with both aspects of azimuthal directions and polar angles, a high contrast ratio can be realized over a wide view angle range. Further, the third-type birefringent layer can be manufactured using a convenient method by employing a material having suitable intrinsic birefringence different from a biaxial retardation film controlled with nx>nz>ny (0<Nz<1). Note that, with the present Specification, "azimuthal direction" represents orientation in a direction parallel to the substrate face of the liquid crystal cell, and assumes 0 to 360 degrees, and "polar angle" represents an inclined angle from the normal direction of the substrate face of the liquid crystal cell, and assumes 0 to 90 degrees.

Specifically, the liquid crystal display device of the present invention may further include at least one third-type birefringent layer at least either of between the first first-type birefringent layer and the liquid crystal cell, and between the liquid crystal cell and the second first-type birefringent layer. The above third-type birefringent layer is particularly suitably employed in the event that a mean value of the Nz coefficients of the first first-type birefringent layer and the second first-type birefringent layer is less than 2.00. The above third-type birefringent layer is preferably disposed adjacent to the liquid crystal cell. Here, "disposed adjacent to" means that no birefringent medium is provided between the third-type birefringent layer and the liquid crystal cell, and also includes, for example, a mode wherein an isotropic film is disposed between the third-type birefringent layer and the liquid crystal cell. Also, in the event that multiple third-type birefringent layers are provided, there is a suitable mode wherein at least one layer of the multiple third-type birefringent layers is disposed adjacent to the liquid crystal cell, and the multiple third-type birefringent layers are disposed adjacent to each other.

Note that nx≈ny in the third-type birefringent layer may be expressed as |nx−ny|≈0, and specifically represents a case where the in-plane retardation R=|nx−ny|×d is less than 20 nm, and is preferably less than 10 nm. Accordingly, the third-type birefringent layer also includes a birefringent layer satisfying a relation of nx=ny>nz. Even if the above third-type birefringent layer is configured of multiple layers or only one layer, the third-type birefringent layer is disposed in an inner side (liquid crystal side) than the above first λ/4 plate or the above second λ/4 plate, and also, as long as summation of thickness direction retardation thereof is the same, the property of transmitted light intensity of the liquid crystal display device is completely the same in principle. Also, in the event that the liquid crystal display device actually includes no third-type birefringent layer as well, there is no problem in principle even if it is virtually conceived that the liquid crystal display device includes a third-type birefringent layer having thickness direction retardation of zero. Accordingly, hereinafter, unless otherwise noted, within the present Specification, description will be simplified with reference to only a liquid crystal display device wherein one third-type birefringent layer is disposed between the above first λ/4 plate and the above liquid crystal cell as the liquid crystal display device of the present invention.

Typical examples of the above polarizer include a polarizer wherein an anisotropic material such as iodine complex or the like having dichroism is absorbed and aligned as to a polyvinyl alcohol (PVA) film. Normally, in order to secure mechanical strength and resistance to moist heat, a protective film such as a triacetylcellulose (TAC) film or the like is laminated on both sides of the PVA film, thereby putting into practical use, but unless otherwise noted, within the present Specification, when referring to "polarizer", this includes no protective film, and specifies only an element having a polarization function. Note that the first and second polarizers are, even if either thereof is a polarizer (polarizer on the rear face side) or analyzer (polarizer on the observation face side), completely the same in principle regarding the property of transmitted light intensity of the liquid crystal display device. That is to say, either of the above first and second first-type birefringent layers may be provided to the observation face side of the above liquid crystal cell.

However, in general, multiple varieties of which the surface treatment layers alone differ need to be manufactured in response to requests from an application and a user, and accordingly, the observation face side circularly-polarizing plate preferably has a simple productive configuration as compared to the rear face side circularly-polarizing plate. On the other hand, there is generally no need to perform surface processing on the rear face side polarizing plate, and accordingly, only one variety has to be manufactured. Therefore, even when the configuration of the rear face side circularly-polarizing plate is somewhat complicated, the effects thereof on mass production capability are relatively small. In the light of such circumstances, it is desirable that a first-type birefringent layer having a larger Nz coefficient (=a birefringent layer with manufacturing by a highly productive manufacturing method being more difficult) is disposed on the rear face side of the liquid crystal cell, and a first-type birefringent layer having a smaller Nz coefficient (=a birefringent layer with manufacturing by a productive manufacturing method being easier) is disposed on the observation face side of the liquid crystal cell. From the same perspective, it is desirable that the second-type birefringent layer is disposed on the rear face side of the liquid crystal cell along with the first-type birefringent layer having a larger Nz coefficient. Also, it is desirable that the third-type birefringent layer is disposed on only the rear face side of the liquid crystal cell.

With a configuration including the third-type birefringent layer, in the event that the retardation (Δnd) of the liquid crystal layer has been changed, this is normally handled by adjusting the retardation of the third-type birefringent layer. However, in the event that the third-type birefringent layer thereof is provided to the observation face side polarizing plate, the problem of increased varieties is furthered, being compounded with the problem of increased varieties due to difference of surface processing. Accordingly, it is particularly desirable to dispose the third-type birefringent layer in the rear face side polarizing plate. For example, in the event of handling five types of surface processing and four types of retardation of the liquid crystal layer, when disposing the third-type birefringent layer in the observation face side circularly-polarizing plate, the observation face side circularly-polarizing plate has 5×4=20 varieties, and the rear face side circularly-polarizing plate has one variety, and accordingly, 21 varieties of circularly-polarizing plates in total are needed. On the other hand, when disposing the third-type birefringent layer in the rear face side circularly-polarizing plate, the observation face side circularly-polarizing plate have five varieties, and the rear face side circularly-polarizing plate has four varieties, and accordingly, only nine varieties of circularly-polarizing plates in total have to be prepared.

From such a perspective, it is desirable that of the first and second first-type birefringent layer, one having a larger Nz coefficient is disposed on the rear face side of the liquid crystal cell. Also, it is desirable that the second-type birefringent layer is disposed on the rear face side of the liquid crystal cell, and at this time, the Nz coefficient of the first first-type birefringent layer is greater than the Nz coefficient of the second first-type birefringent layer, it is desirable that the second-type birefringent layer, and the first first-type birefringent layer are disposed on the rear face side of the liquid crystal cell. Further, in the event that the Nz coefficient of the first first-type birefringent layer is greater than the Nz coefficient of the second first-type birefringent layer, it is desirable that the liquid crystal display device of the present invention further includes a surface treatment layer on the observation face side of the second polarizer. It is also desirable that at least one third-type birefringent layer is disposed on the rear face side of the liquid crystal cell, and at this time, the Nz coefficient of the first first-type birefringent layer is greater than the Nz coefficient of the second first-type birefringent layer, and it is more desirable that the second-type birefringent layer, the first first-type birefringent layer, and at least the one third-type birefringent layer are disposed on the rear face side of the liquid crystal cell.

Hereinafter, unless otherwise noted, within the present Specification, description will be simplified with reference to only a liquid crystal display device wherein the first polarizer is a polarizer.

The above liquid crystal cell includes a pair of substrates which mutually face, and a liquid crystal layer sandwiched between the pair of substrates. The liquid crystal cell according to the present invention is a vertical alignment (Vertical Alignment: VA) mode liquid crystal cell configured to perform black display by aligning liquid crystal molecules within the liquid crystal layer in a manner generally perpendicular to the substrate faces. The VA mode includes Multi-domain VA (MVA) mode, Continuous Pinwheel Alignment (CPA) mode, Patterned VA (PVA) mode, Biased VA (BVA) mode, Reverse TN (RTN) mode, In Plane Switching-VA (IPS-VA) mode, and so forth. With the present Specification, when "disposing liquid crystal molecules generally perpendicular to the substrate faces", a mean pretilt angle of liquid crystal molecules suffices to be equal to or greater than 80 degrees.

The liquid crystal display device of the present invention includes, between the first polarizer and the second polarizer, a first first-type birefringent layer of which the in-plane retardation has been adjusted to $\lambda/4$ (first $\lambda/4$ plate), a second first-type birefringent layer of which the in-plane retardation has been adjusted to $\lambda/4$ (second $\lambda/4$ plate), and a second-type birefringent layer. The liquid crystal display device of the present invention may further include, as described above, between the first polarizer and the second polarizer, a third-type birefringent layer, but from a perspective of realizing further cost reduction, it is desirable that no third-type birefringent layer is provided between the first polarizer and the second polarizer. With a mode wherein no third-type birefringent layer is included, in the event of changing the retardation ($\Delta$nd) of the liquid crystal layer, it is desirable to adjust the Nz coefficient of the $\lambda/4$ plate having a greater Nz coefficient. Thus, a circularly-polarizing plate including a $\lambda/4$ plate having a smaller Nz coefficient (=a $\lambda/4$ plate with manufacturing by a productive manufacturing method being easier) can be shared as to multiple types of liquid crystal cells of which the retardations of the liquid crystal layers mutually differ.

Each of the Nz coefficient of the first first-type birefringent layer and the Nz coefficient of the second first-type birefringent layer can be set as appropriate, but is preferably greater than 1. Also, it is desirable that the Nz coefficient of one of the first first-type birefringent layer and the second first-type birefringent layer is equal to or greater than 2, and the other Nz coefficient of the first first-type birefringent layer and the second first-type birefringent layer is equal to or greater than 1 but less than 2. Thus, the $\lambda/4$ plate having a smaller Nz coefficient can be manufactured using technology that particularly excels in productivity (e.g., technology described in NPL 2). Also, a commercially available $\lambda/4$ plate (general-purpose article) of which the Nz coefficient has been set to approximate 1.6 can be employed as the $\lambda/4$ plate having a smaller Nz coefficient, and accordingly, a commercially available circularly-polarizing plate can be also used as the circularly-polarizing plate including the $\lambda/4$ plate having a smaller Nz coefficient. Also, multiple types of circularly-polarizing plates subjected to mutually different surface processing are commercially available. Thus, the Nz coefficient of one of the $\lambda/4$ plates is set to equal to or greater than 1 but less than 2, whereby cost of the circularly-polarizing plate including this $\lambda/4$ plate can significantly be reduced, and also, productivity thereof can markedly be improved. Also, the Nz coefficient of one of the $\lambda/4$ plates is set to equal to or greater than 1 but less than 2, and the Nz coefficient of the other $\lambda/4$ plate is set to equal to or greater than 2, whereby the mean value Nzq of the Nz coefficients of the first and second $\lambda/4$ plates can readily be set to a later-described desirable range. Note that there are cases where highly productive manufacturing technology such as the roll-to-roll lamination technology or the like cannot be used for manufacturing of a circularly-polarizing plate including the $\lambda/4$ plate having a greater Nz coefficient. However, the circularly-polarizing plate is only affected on the observation face side or rear face side, which is considerably small as compared to a case where the circularly-polarizing plate is affected on both sides.

A combination of the first $\lambda/4$ plate and the second-type birefringent layer may be a laminated body in which the first $\lambda/4$ plate and the second-type birefringent layer have been laminated via no adhesive (via an adhesive agent), but preferably is a laminated body in which the first $\lambda/4$ plate and the second-type birefringent layer have been laminated via an adhesive. As described above, preferred modes for the liquid crystal display device of the present invention include a mode wherein the first $\lambda/4$ plate and the second-type birefringent layer are provided to the rear face side of the liquid crystal cell, and the Nz coefficient of the first $\lambda/4$ plate is greater than the Nz coefficient of the second $\lambda/4$ plate. With this mode, there may be a case where it is difficult to manufacture the first $\lambda/4$ plate using a diagonal drawing method suitable for use in the roll-to-roll lamination technology. Therefore, from a perspective of minimally suppressing influence thereof, it is desirable to manufacture this mode using the following method. Specifically, according to the roll-to-roll lamination technology, the second-type birefringent layer is adhered on the first polarizer using an adhesive agent. The first λ/4 plate is manufactured using a method other than the diagonal drawing method (e.g., tenter transverse uniaxial drawing method, vertical and horizontal biaxial drawing method, or the like). The first λ/4 plate is adhered on the second-type birefringent layer on the first polarizer using an adhesive. This adhesion processing may be performed by batch processing. Note that there is concern that employing batch processing may reduce productivity. However, with the liquid crystal display device of the present invention, there are many other advantages, such as a commercially available circularly-polarizing plate being usable as the circularly-polarizing plate including the second λ/4 plate, and such as flexible handling of design change being enabled, and accordingly, disadvantages of batch processing can sufficiently be redeemed. Further, when assuming employing batch processing for manufacturing a circularly-polarizing plate including the λ/4 plate having a larger Nz coefficient (=a λ/4 plate with manufacturing by a productive manufacturing method being more difficult), there is also an advantage in that this λ/4 plate can readily be manufactured using a method other than the diagonal drawing method.

It is desirable that a combination of the first λ/4 plate or second λ/4 plate and the third-type birefringent layer is a laminated body in which the first λ/4 plate or second λ/4 plate and the third-type birefringent layer are laminated via no adhesive. Such a laminated body may be manufactured using a method for laminating those via an adhesive agent simultaneously with extrusion membrane formation such as a co-extrusion method or the like, or a method for forming one of the birefringent layers within the laminated body from a polymer film, and laminating the other birefringent layer formed of a liquid crystal material or non-liquid crystal material on this polymer film by coating or transfer, or the like. In particular, the third-type birefringent layer is frequently manufactured by a method for coating a non-liquid crystal material such as polyimide or the like, or a liquid crystal material such as cholesteric liquid crystal or the like, and accordingly, the latter method employing coating or transfer can preferably be employed at the time of manufacturing a laminated body between the first λ/4 plate or second λ/4 plate and the third-type birefringent layer.

With the liquid crystal display device of the present invention, light input from the front direction to the first polarizer is transformed into linearly-polarized light by the first polarizer, transmits through the second-type birefringent layer while keeping the polarization state, and is transformed from the linearly-polarized light into circularly-polarized light by the first λ/4 plate, transmits through the third-type birefringent layer and liquid crystal cell while keeping the polarization state, and is retransformed from the circularly-polarized light into linearly-polarized light in the same polarization state as immediately after transmitting through the first polarizer, and the linearly-polarized light is shielded by the second polarizer orthogonal to the first polarizer, whereby good black display is obtained. That is to say, the second-type and third-type birefringent layers are not aimed at transforming the polarization state of light input from the front direction.

Note that the above description has been made with black display being obtained by tracing the polarization state that changes each time light transmits through each layer, which will be understood more intuitively by the following description. Specifically, with the liquid crystal display device of the present invention, in the front direction, (1) the first and second λ/4 plates included between the first and second polarizers are generally orthogonal to each other, and also, mutual retardations are generally the same (λ/4), and accordingly, the retardations are mutually cancelled out, and practically disabled, (2) the second-type birefringent layer included between the first and second polarizers is practically disabled since a fast axis thereof is generally orthogonal to the absorption axis of the first polarizer, and further, (3) the third-type birefringent layer and liquid crystal cell included between the first and second polarizers are practically disabled since retardation is generally zero in the front direction, and further, (4) good black display (or complete black display) of the Cross Nicol polarizer is obtained since the first and second polarizers are generally orthogonal to each other to make up a so-called Cross Nicol polarizer.

On the other hand, with the liquid crystal display device of the present invention, when assuming that there is no transformation of a polarization state by the second-type and third-type birefringent layers in the oblique direction, according to later-described three reasons, light input to the first polarizer from the oblique direction is not shielded by the second polarizer, and accordingly, complete black display is not obtained. That is to say, the second-type and third-type birefringent layers are aimed at principally transforming the polarization state of light input from the oblique direction (only the polarization state of light input from the oblique direction may be transformed) to perform view angle compensation.

As described above, the second-type and third-type birefringent layers in the liquid crystal display device of the present invention enables good black display to be obtained even from the oblique direction while keeping good black display in the front direction, thereby improving the contrast ratio in the oblique direction, and enabling a liquid crystal display device which excels in the viewing angle property to be realized.

Next, description will be made in detail regarding three reasons to transform the polarization state of light input from the oblique direction by the second-type and third-type birefringent layers and to perform view angle compensation. Now, let us consider a circularly-polarized VA mode liquid crystal display device 100 in which, as illustrated in FIG. 1, a first polarizer (the azimuthal direction 90 degrees of an absorption axis) 110, a first λ/4 plate (the azimuthal direction 135 degrees of a slow axis) 120, a VA mode liquid crystal cell 130, a second λ/4 plate (the azimuthal direction 45 degrees of a slow axis) 140, and a second polarizer (the azimuthal direction 0 degrees of an absorption axis) 150 are laminated in this order, which has the simplest configuration excluding the second-type and third-type birefringent layers. Note that, in FIG. 1, arrows drawn in the first and second polarizers 110 and 150 represent the azimuthal directions of the absorption axes thereof, arrows drawn in the first and second λ/4 plates 120 and 140 represent the azimuthal directions of the slow axes thereof, and an ellipsoid drawn in the VA mode liquid crystal cell 130 represents the shape of an index ellipsoid thereof.

First, when considering black display in the front direction, light input to the first polarizer 110 from the front direction is transformed into linearly-polarized light by the first polarizer 110, transformed from the linearly-polarized light into circularly-polarized light by the first λ/4 plate 120, transmits through the liquid crystal cell 130 while keeping the polarization state, retransformed from the circularly-polarized into linearly-polarized light in the same polarization state as immediately after transmitting through the first polarizer 110 by the second λ/4 plate 140 having an orthogonal relation with the first λ/4 plate 120, and the linear-polarized light is shielded by the second polarizer 150 orthogonal to the first polarizer 110, whereby good black display is obtained. In other words, with the liquid crystal display device 100, in the front direction, (1) the first and second λ/4 plates 120 and 140 included between the first and second polarizers 110 and 150 are orthogonal to each other, and also, mutual retardations are the same (λ/4), and accordingly, the retardations are mutually cancelled out, and practically disabled, (2) the liquid crystal cell 130 included between the first and second polarizers 110 and 150 are practically disabled since retardation is generally zero in the front direction, and further, (3) complete black display is obtained since the first and second polarizers 110 and 150 are mutually orthogonal to make up a so-called Cross Nicol polarizer.

Next, when considering black display in the oblique direction, complete black display is not obtained according to reasons of the following view angle hindrance factors (1) to (3).

(1) The first and second λ/4 plates 120 and 140 are not orthogonal to each other, or mutual retardations do not agree, and accordingly not disabled.

(2) The retardation of the liquid crystal cell 130 is not zero, and accordingly not disabled.

(3) The first and second polarizers 110 and 150 are not orthogonal to each other, and accordingly, a Cross Nicol polarizer is not configured.

The above view angle hindrance factors (1) to (3) will further be described in detail with reference to FIG. 2. As schematically illustrated in (a) in FIG. 2, in the front direction (normal direction as to the substrate faces), while a slow axis 121 of the first λ/4 plate 120 and a slow axis 141 of the second λ/4 plate 140 are orthogonal to each other, in the oblique direction in the azimuthal direction 0 degrees, the slow axis 121 of the first λ/4 plate 120 and the slow axis 141 of the second λ/4 plate 140 are not orthogonal to each other, and accordingly, retardations are mutually not cancelled out and not disabled. Also, as schematically illustrated in (b) in FIG. 2, in the front direction, while the slow axis 121 of the first λ/4 plate 120 and the slow axis 141 of the second λ/4 plate 140 are orthogonal to each other, in the oblique direction in the azimuthal direction 45 degrees, while the slow axes 121 and 141 of the first and second λ/4 plates 120 and 140 are orthogonal to each other, mutual retardations are not the same, and accordingly, the retardations are mutually not cancelled out. The retardation is determined by birefringence (refractive index difference)×thickness, but practical birefringence differs between the front direction and the oblique direction, and moreover depends on azimuthal directions, which is the cause thereof. Due to the same reason, the retardation of the VA mode liquid crystal cell 130 that has been zero in the front direction does not become zero in an optional oblique direction. Practical birefringence only in the front direction becomes zero, and retardation also becomes zero. Further, as schematically illustrated in (c) in FIG. 2, in the front direction, the absorption axis 111 of the first polarizer 110, and the absorption axis 151 of the second polarizer 150 are orthogonal to each other, but on the other hand, in the oblique direction in the azimuthal direction 45 degrees, the absorption axis 111 of the first polarizer 110, and the absorption axis 151 of the second polarizer 150 are not orthogonal to each other.

As described above, the circularly-polarized VA mode liquid crystal display device 100 having the minimum configuration cannot obtain complete black display in the oblique direction due to the above three view angle hindrance factors (1) to (3). Conversely, if handling of these hindrance factors, that is, optical compensation can be performed, better black display can also be obtained even in the oblique direction. Note that, in many cases, the above view angle hindrance factors (1) and (2) are compounded and observed. Accordingly, in the event that these are subjected to optical compensation as well, instead of individual optimization, there may be employed a technique such that the view angle hindrance factors (1) and (2) are subjected to total optimization.

With the circularly-polarized VA mode liquid crystal display device of the present invention, based on design guidelines such as described below in detail, design is made so as to subject the above view angle hindrance factors (1) to (3) to optical compensation at the same time. Specifically, after assuming that the first and second λ/4 plates are taken as a biaxial λ/4 plate (first-type birefringent layer) satisfying a relation of nx>ny≥nz, the Nz coefficients thereof are mutually changed, a birefringent layer (second-type birefringent layer) satisfying a relation of nx<ny≤nz is disposed between the first λ/4 plate and the first polarizer, and further, a birefringent layer (third-type birefringent layer) satisfying a relation of nx≈ny>nz is disposed between the first and second λ/4 plates as necessary, thereby realizing optical compensation.

Now, design guidelines for birefringent layers in the liquid crystal display device of the present invention will be described. The present inventor has studied various ways to easily and effectively perform optical compensation of the above view angle hindrance factors, and has focused on that a factor requiring optical compensation differs depending on azimuthal directions. As indicated in the following Table 1, the present inventor has found that optical compensation of a polarizer as to the view angle hindrance factor (3) is unnecessary in the azimuthal direction 0 degree, and has found that only optical compensation of a λ/4 plate as to the view angle hindrance factor (1) and optical compensation of the liquid crystal cell as to the view angle hindrance factor (2) have to be performed in this azimuthal direction.

TABLE 1

| | NECESSITY OF OPTICAL COMPENSATION | | |
|---|---|---|---|
| AZIMUTHAL DIRECTION | (1) λ/4 PLATE | (2) LIQUID CRYSTAL CELL | (3) POLARIZER |
| 0 DEGREES | NECESSARY | NECESSARY | UNNECESSARY |
| 45 DEGREES | NECESSARY | NECESSARY | NECESSARY |

Further, the present inventor has conceived that, according to a polarization state illustration employing a Poincare sphere, and computer simulation, a mean value Nzq of the Nz coefficients of the first and second λ/4 plates, and thickness direction retardation Rlc of the liquid crystal cell are subjected to optimal adjustment, and accordingly, further, according to need, a third-type birefringent layer satisfying a relation of nx=ny>nz is disposed between the first and second λ/4 plates, and thickness direction retardation R3 thereof is also subjected to optimal adjustment, and accordingly, in the azimuthal direction 0 degrees, the above view angle hindrance factors (1) and (2) can simultaneously and effectively be subjected to optical compensation. Within the present Specification, a process will be called as a 1st step wherein, with optical compensation in the azimuthal direction 0 degrees as described above as a target, the optimal values of the mean value Nzq of the Nz coefficients of the first and second λ/4 plates, the thickness direction retardation Rlc of the liquid crystal cell, and the thickness direction retardation R3 of the third-type birefringent layer are selected.

The present inventor has conceived that after this 1st step, a second-type birefringent layer satisfying a relation of nx<ny≤nz is disposed between the first λ/4 plate and the first polarizer so that the in-plane fast axis thereof is generally orthogonal to the absorption axis of the first polarizer, and the Nz coefficient Nz2 thereof and the in-plane retardation R2 are subjected to optimal adjustment, whereby the above view angle hindrance factors (1), (2), and (3) can simultaneously and effectively be subjected to optical compensation in the azimuthal direction 45 degrees. Within the present Specification, as described above, after the 1st step, with the optical compensation in the azimuthal direction 45 degrees as a target, a process to select the optimal values of the Nz coefficient Nz2 and in-plane retardation R2 of the second-type birefringent layer will be called as a 2nd step.

The in-plane fast axis of the second-type birefringent layer to be added in the 2nd step is disposed so as to be generally orthogonal to the absorption axis of the adjacent first polarizer, and accordingly, the azimuthal direction of the absorption axis of the first polarizer, that is, the optical property in the azimuthal direction 0 degrees is not practically changed (may not completely be changed). That is to say, it is a feature of the optical compensation process in the liquid crystal display device of the present invention that even after the 2nd step, the optimized state obtained in the 1st step is still saved. In this manner, it facilitates design of birefringent layers that the 1st step and 2nd step can completely independently be studied.

The details of optical compensation principle according to the above 1st step and 2nd step will be described as follows with an illustration employing a Poincare sphere. A way of thinking according to the Poincare sphere has widely been known in fields such as crystal optics and so forth as a technique effective for tracing a polarization state that is changed through a birefringent layer (e.g., see NPL 3).

With the Poincare sphere, right-handed polarized light is represented in the upper hemisphere, left-handed polarized light is represented in the lower hemisphere. Linearly-polarized light is represented in the equator, and right handed circularly-polarized light and left handed circularly-polarized light are represented in both upper and lower poles respectively. Two polarization states having a symmetry relation as to the center of the sphere make up a pair of orthogonal polarized lights since the absolute values of ellipticity angles thereof are equal, and also, polarities thereof are reversed.

Also, a function of a birefringent layer on the Poincare sphere is to transform a point representing a polarization state immediately before passing through the birefringent layer into a point rotationally transferred counterclockwise by an angle determined by $(2\pi)\times$(retardation)/(wavelength) (units: rad) with a slow axis on the Poincare sphere (in more accurate terms, of two intrinsic vibration modes of a birefringent layer, the position of a point on the Poincare sphere representing a slower polarization state) as the center (this is true even when rotationally transferring the point clockwise with a fast axis as the center).

A rotation center and a rotation angle in the event of observing from the oblique direction are determined by a slow axis (or fast axis) and retardation with an observation angle thereof. Though detailed description will be omitted, these can be calculated by solving a Fresnel equation for the normal incidence to know the vibration directions and wave number vectors of the intrinsic vibration modes within the birefringent layer, for example. The slow axis in the event of observing from the oblique direction depends on the observation angle and Nz coefficient, and retardation in the event of observing from the oblique direction depends on the observation angle, Nz coefficient, and in-plane retardation R (or thickness direction retardation Rth).

(Compensation Principle in 1st Step)

First, let us consider a polarization state in the event of observing the circularly-polarized VA mode liquid crystal display device 100 in FIG. 1 from the front direction. Under this condition, when illustrating a polarization state each time light emitted from a backlight (though not illustrated in FIG. 1, located below the first polarizer) transmits through each of the polarizers 110 and 150, each of the birefringent layers 120 and 140, and the liquid crystal cell 130 using an S1-S2 plane of the Poincare sphere, this becomes as illustrated in FIG. 3. Note that a point representing each polarization state actually exists on the Poincare sphere, but these are illustrated by being projected on the S1-S2 plane. Also, a point representing a polarization state is illustrated with a white circle, and a point representing a slow (fast) axis of a birefringent layer is illustrated with a x-mark.

First, a polarization state immediately after transmitting through the first polarizer 110 is located in a point P0 on the Poincare sphere, and agrees with a polarization state in which the second polarizer 150 represented with a point E can be absorbed, that is, an extinction point (the azimuthal direction of the absorption axis) of the second polarizer 150. The light is subjected to rotation transformation of a particular angle with the slow axis of the first λ/4 plate 120 represented with a point Q1 on the Poincare sphere as the center by transmitting through the first λ/4 plate 120, and the polarization state located in the point P0 reaches a point P1. A rotation direction at this time is counterclockwise as viewed from the point Q1 toward the origin O (center point of the Poincare sphere).

Next, the light transmits through the VA mode liquid crystal cell 130, but the retardation of the VA mode liquid crystal cell 130 is zero in the front direction, and accordingly, the polarization state is not changed. Finally, the light is subjected to rotation transformation of a particular angle with the slow axis of the second λ/4 plate 140 represented with a point Q2 as the center by transmitting through the second λ/4 plate 140, and the polarization state reaches a point P2. This point P2 agrees with the extinction point E of the second polarizer 150. In this manner, the liquid crystal display device 100 in FIG. 1 can shield the light from the backlight as observed from the front direction, and good black display is obtained.

Further, let us consider a polarization state in the event of observing the circularly-polarized VA mode liquid crystal display device 100 in FIG. 1 from a direction inclined 60 degrees from the normal direction (hereinafter, also referred to as polar 60 degrees) in the azimuthal direction 0 degrees of the absorption axis of the second polarizer 150. Under this condition, when illustrating a polarization state each time light emitted from the backlight transmits through each of the polarizers 110 and 150, each of the birefringent layers 120 and 140, and the liquid crystal cell 130 using an S1-S2 plane of the Poincare sphere, this becomes as illustrated in FIG. 4.

First, a polarization state immediately after transmitting through the first polarizer 110 is located in a point P0 on the Poincare sphere, and agrees with a polarization state in which the second polarizer 150 represented with a point E can be absorbed, that is, an extinction point (the azimuthal direction of the absorption axis) of the second polarizer 150. The light is subjected to rotation transformation of a particular angle with the slow axis of the first λ/4 plate 120 represented with a point Q1 on the Poincare sphere as the center by transmitting through the first λ/4 plate 120, and the polarization state located in the point P0 reaches a point P1. A rotation direction at this time is counterclockwise as viewed from the point Q1 toward the origin O.

Next, the light is subjected to rotation transformation of a particular angle with the slow axis of the liquid crystal cell 130 represented with a point L on the Poincare sphere as the center by transmitting through the VA mode liquid crystal cell 130, and the polarization state reaches a point P2. A rotation direction at this time is counterclockwise as viewed from the point L toward the origin O. Finally, the light is subjected to rotation transformation of a particular angle with the slow axis of the second λ/4 plate 140 represented with a point Q2 as the center by transmitting through the second λ/4 plate 140, and the polarization state reaches a point P3. This point P3 does not agree with the extinction point E of the second polarizer 150. In this manner, the liquid crystal display device 100 in FIG. 1 cannot shield the light from the backlight as observed from the azimuthal direction 0 degrees and polar 60 degrees.

Note that the positions of the points P1 to P3 in FIG. 3 and FIG. 4 depend on an Nz coefficient NzQ1 of the first λ/4 plate 120, an Nz coefficient NzQ2 of the second λ/4 plate 140, and thickness direction retardation Rlc of the liquid crystal cell 130, but FIG. 3 and FIG. 4 illustrate a mode with the Nzq1=Nzq2=2.0, and the Rlc=320 nm as an example. In order to make transformation of a polarization state understandable, the position of each point is roughly illustrated, and there is included information that is inaccurate in a precise sense. Also, in order to clearly illustrate the drawings, no arrow representing a locus is illustrated regarding transformation of the points P1 to P3. Note that the Rlc of the VA mode liquid crystal cell 130 is typically around 320 nm, but generally adjusted within a range of 270 to 400 nm. For example, in order to increase transmittance, the Rlc may be increased larger than 320 nm. The NzQ1 and NzQ2 of the first and second λ/4 plates 120 and 140 are generally adjusted within a range of 1.0 to 2.9. For example, even when employing a VA mode liquid crystal cell of which the Rlc has been set to around 400 nm, with a mode where not third-type birefringent layer is provided, two λ/4 plates of which a mean value of the Nz coefficients has mutually been adjusted to 2.9 are suitably employed.

Next, as illustrated in FIG. 5, let us consider a circularly-polarized VA mode liquid crystal display device 200 including a third-type birefringent layer, in which a first polarizer (the azimuthal direction 90 degrees of an absorption axis) 210, a first λ/4 plate (the azimuthal direction 135 degrees of a slow axis) 220, a third-type birefringent layer 235, a VA mode liquid crystal cell 230, a second λ/4 plate (the azimuthal direction 45 degrees of a slow axis) 240, and a second polarizer (the azimuthal direction 0 degrees of an absorption axis) 250 are laminated in this order. Note that arrows drawn in the first and second polarizers 210 and 250 in FIG. 5 represent the azimuthal directions of the absorption axes thereof, and arrows drawn in the first and second λ/4 plates 220 and 240 represent slow the azimuthal directions of the slow axes thereof, and ellipsoids drawn in the VA mode liquid crystal cell 230 and birefringent layer 235 represent the shapes of index ellipsoids thereof.

First, let us consider a polarization state in the event of observing the circularly-polarized VA mode liquid crystal display device 200 in FIG. 5 from the front direction. Under this condition, when illustrating a polarization state each time light emitted from a backlight (though not illustrated in FIG. 5, located below the first polarizer 210) transmits through each of the polarizers 210 and 250, each of the birefringent layers 220, 240, and 235, and the liquid crystal cell 230 using an S1-S2 plane of the Poincare sphere, this becomes as illustrated in FIG. 6.

First, a polarization state immediately after transmitting through the first polarizer 210 is located in a point P0 on the Poincare sphere, and agrees with a polarization state in which the second polarizer 250 represented with a point E can be absorbed, that is, an extinction point (the azimuthal direction of the absorption axis) of the second polarizer 250. The light is subjected to rotation transformation of a particular angle with the slow axis of the first λ/4 plate 220 represented with a point Q1 on the Poincare sphere as the center by transmitting through the first λ/4 plate 220, and the polarization state located in the point P0 reaches a point P1. A rotation direction at this time is counterclockwise as viewed from the point Q1 toward the origin O.

Next, the light transmits through the third-type birefringent layer 235 and VA mode liquid crystal cell 230, but the retardations of both of third-type birefringent layer 235 and VA mode liquid crystal cell 230 are zero in the front direction, and accordingly, the polarization state is not changed. Finally, the light is subjected to rotation transformation of a particular angle with the slow axis of the second λ/4 plate 240 represented with a point Q2 as the center by transmitting through the second λ/4 plate 240, and the polarization state reaches a point P2. This point P2 agrees with the extinction point E of the second polarizer 250. In this manner, the liquid crystal display device 200 in FIG. 5 can shield the light from the backlight as observed from the front direction in the same way as with the liquid crystal display device 100 in FIG. 1, and good black display is obtained.

Further, let us consider a polarization state in the event of observing the circularly-polarized VA mode liquid crystal display device 200 in FIG. 5 from a direction inclined 60 degrees in the azimuthal direction 0 degrees of the absorption axis of the second polarizer 210. Under this condition, when illustrating a polarization state each time light emitted from the backlight transmits through each of the polarizers 210 and 250, each of the birefringent layers 220, 240, and 235, and the liquid crystal cell 230 using an S1-S2 plane of the Poincare sphere, this becomes as illustrated in FIG. 7-1.

First, a polarization state immediately after transmitting through the first polarizer 210 is located in a point P0 on the Poincare sphere, and agrees with a polarization state in which the second polarizer 250 represented with a point E can be absorbed, that is, an extinction point (the azimuthal direction of the absorption axis) of the second polarizer 250. The light is subjected to rotation transformation of a particular angle with the slow axis of the first λ/4 plate 220 represented with a point Q1 on the Poincare sphere as the center by transmitting through the first λ/4 plate 220, and the polarization state located in the point P0 reaches a point P1. A rotation direction at this time is counterclockwise as viewed from the point Q1 toward the origin O.

Next, the light is subjected to rotation transformation of a particular angle with the slow axis of the third-type birefringent layer 235 represented with a point R3 on the Poincare sphere as the center by transmitting through the third-type birefringent layer 235, and the polarization state reaches a point P2. A rotation direction at this time is counterclockwise as viewed from the point R3 toward the origin O. Next, the light is subjected to rotation transformation of a particular angle with the slow axis of the liquid crystal cell 230 represented with a point L on the Poincare sphere as the center by transmitting through the VA mode liquid crystal cell 230, and the polarization state reaches a point P3. A rotation direction at this time is counterclockwise as viewed from the point L toward the origin O. Finally, the light is subjected to rotation transformation of a particular angle with the slow axis of the second λ/4 plate 240 represented with a point Q2 as the center by transmitting through the second λ/4 plate 240, and the polarization state reaches a point P4. This point P4 agrees with the extinction point E of the second polarizer 250. In this manner, the liquid crystal display device 200 in FIG. 5 can shield the light from the backlight in the same way as observed from the front direction, even when observing from the oblique direction of the azimuthal direction 0 degrees and polar 60 degrees.

Note that the positions of the points P1 to P4 in FIG. 6 and FIG. 7-1 depend on an Nz coefficient NzQ1 of the first λ/4 plate 220, an Nz coefficient NzQ2 of the second λ/4 plate 240, thickness direction retardation R3 of the third-type birefringent layer 235, and thickness direction retardation Rlc of the liquid crystal cell 230, but FIG. 6 and FIG. 7-1 illustrate a mode with the Nzq1=Nzq2=2.0, R3=−61 nm, and the Rlc=320 nm as an example. In order to make transformation of a polarization state understandable, the position of each point is roughly illustrated, and there is included information that is inaccurate in a precise sense. Also, in order to clearly illustrate the drawings, no arrow representing a locus is illustrated regarding transformation of the points P1 to P4.

As a result of the present inventor's study, it has been proven that according to the Nz coefficient NzQ1 of the first λ/4 plate 220, and the Nz coefficient NzQ2 of the second λ/4 plate 240, there is an optimal retardation value R3 of the third-type birefringent layer 235.

Now, Table 2 and FIG. 8 illustrate results investigated by computer simulation regarding a relation of the Nz coefficient NzQ1 of the first λ/4 plate 220, the Nz coefficient NzQ2 of the second λ/4 plate 240, and the optimal value of the thickness direction retardation R3 of the third-type birefringent layer 235. With the illustration employing the Poincare sphere in FIG. 7-1, polarization state transformation of the point P1→P3 is illustrated by being divided into P1→P2 transformation according to the thickness direction retardation R3 of the third-type birefringent layer 235, and P2→P3 transformation according to the thickness direction retardation Rlc of the VA mode liquid crystal cell 230. However, these two transformations have the same rotation center, though their rotation directions are mutually reversed, wherein the rotation directions are determined with the sign of thickness direction retardation, and the rotation angle is determined with the absolute value of thickness direction retardation. Accordingly, the above two transformations are the same as regarded as direct P1→P2 transformation according to "total thickness direction retardation R3+Rlc" of "the third-type birefringent layer 235+VA mode liquid crystal cell 230". In other words, if the R3+Rlc is the same, the optical property of the liquid crystal device is the same not depending on the thickness direction retardation Rlc of the VA mode liquid crystal cell 230. Accordingly, Table 2 illustrates results obtained by calculating the optimal value of the R3+Rlc using computer simulation. Also, for simplicity, computer simulation has been preformed here assuming that the Nz coefficient NzQ1 of the first λ/4 plate 220 and the Nz coefficient NzQ2 of the second λ/4 plate 240 are the same (Nzq1=Nzq2=Nzq), but as will be described later, even when the Nz coefficient NzQ1 of the first λ/4 plate 220 and the Nz coefficient Nzq2 of the second λ/4 plate 240 mutually differ, the optimal retardation value R3 of the third-type birefringent layer 235 may be calculated, by assuming that each of the NzQ1 and NzQ2 is equal to a mean value Nzq thereof, and according to the Nzq thereof, and it has been found by the present inventor that the results of Table 2 and FIG. 8 can be referenced without change. As can be understood from Table 2 and FIG. 8, with regard to a relation between the mean value Nzq and the optimal Rlc+R3, the following Expression (A) provides sufficiently good approximation in a range of $1.0 \leq Nzq \leq 2.9$. A solid line illustrated in FIG. 8 represents the following Expression (A).

$$Rlc + R3 = 169 \text{ nm} \times Nzq - 81 \text{ nm} \quad (A)$$

From a perspective of realizing a liquid crystal display having a high contrast ratio over a wide view angle range, it is most desirable that the R3+Rlc which is sum of the thickness direction retardation R3 of the third-type birefringent layer 235, and the thickness direction retardation Rlc at the time of black display of the above VA mode liquid crystal cell 230 (when applying no voltage to the liquid crystal layer) is the optimal value illustrated in Table 2 and FIG. 8, but as long as a range where a contrast ratio at an oblique view angle is not significantly deteriorated, the R3+Rlc may somewhat deviates from the optimal value. From a perspective of manifesting the operational advantages of the liquid crystal display device of the present invention, a range of the optimal value±50 nm is preferred.

TABLE 2

| Nzq | Rlc + R3 (nm) |
|---|---|
| 1.00 | 88 |
| 1.10 | 105 |
| 1.20 | 122 |
| 1.30 | 140 |
| 1.40 | 157 |
| 1.50 | 174 |
| 1.60 | 191 |
| 1.70 | 208 |
| 2.00 | 259 |
| 2.30 | 309 |
| 2.40 | 325 |
| 2.50 | 342 |
| 2.90 | 406 |

Now, even when the Nz coefficient NzQ1 of the first λ/4 plate 220 and the Nz coefficient NzQ2 of the second λ/4 plate 240 mutually differ, a reason will be described whereby an excellent viewing angle property can be obtained by employing the optimal retardation R3 of the third-type birefringent layer 235 calculated assuming that each of the NzQ1 and NzQ2 is equal to the mean value Nzq thereof to shield light leakage in the event of observing from the oblique direction with the azimuthal direction 0 degrees and polar 60 degrees.

FIG. 7-1 illustrates, as described above, a mode with Nzq1=Nzq2=2.0, R3=−61 nm, and Rlc=320 nm. FIG. 7-2 illustrates a mode with Nzq1=3.0, Nzq2=1.0, R3=−61 nm, and Rlc=320 nm, FIG. 7-3 illustrates a mode with Nzq1=2.5, Nzq2=1.5, R3=−61 nm, and Rlc=320 nm, FIG. 7-4 illustrates a mode with Nzq1=1.0, Nzq2=3.0, R3=−61 nm, and Rlc=320 nm, and FIG. 7-5 illustrates a mode with Nzq1=1.5, Nzq2=2.5, R3=−61 nm, and Rlc=320 nm, and any of these modes has 2.0 as the mean value Nzq of the NzQ1 and NzQ2 in the same way as with the case of FIG. 7-1. As can be understood from the drawings, even with any mode, the point P4 agrees with the extinction point E of the second polarizer 250, and these liquid crystal devices can shield light from the backlight even when observing from the oblique direction with the azimuthal direction 0 degrees and polar 60 degrees, in the same way as with a case of observing from the front direction.

As collectively illustrated in FIG. 7-6, the slow axis Q1 of the first λ/4 plate 220 approximates, with a case where the NzQ1 is 2.0 as a reference, the S2 axis side when the NzQ1 becomes smaller than 2.0, and approximates the S1 axis side when the NzQ1 becomes greater than 2.0. The slow axis Q2 of the second λ/4 plate 240 approximates, with a case where the NzQ2 is 2.0 as a reference, the S1 axis side when the NzQ2 becomes greater than 2.0, and approximates the S2 axis side when the NzQ2 becomes smaller than 2.0. Accordingly, with design of the Nzq1=Nzq2=Nzq=2.0 as a reference, in the event of setting the NzQ1 smaller by ΔNzq, the NzQ2 is set greater by ΔNzq, and accordingly, the rotation center of P0→P1 transformation, and the rotation center of P3→P4 transformation are suitably shifted in the same direction, and an angle P1P0P3 can be kept generally in the same, and consequently, in the same way as with the case of the Nzq1=Nzq2=Nzq=2.0, the point P4 can agree with the extinction point E of the polarizer 250. In contrast to this case, with design of the Nzq1=Nzq2=Nzq=2.0 as a reference, in the event of setting the Nzq1 greater by ΔNzq, the NzQ2 is set smaller by ΔNzq, and accordingly, the rotation center of P0→P1 transformation, and the rotation center of P3→P4 transformation are suitably shifted in the same direction, and consequently, in the same way as with the case of the Nzq1=Nzq2=Nzq=2.0, the point P4 can agree with the extinction point E of the polarizer 250.

From the above, even when the Nz coefficient NzQ1 of the first λ/4 plate 220 and the Nz coefficient NzQ2 of the second λ/4 plate 240 mutually differ, an excellent viewing angle property may be obtained by employing the optimal retardation R3 of the third-type birefringent layer 235 calculated assuming that each of the NzQ1 and NzQ2 is equal to the mean value Nzq thereof to shield light leakage in the event of observing from the oblique direction with the azimuthal direction 0 degrees and polar 60 degrees. Note that, when treating the Nz coefficient NzQ1 and Nz coefficient NzQ2 as individual independent coefficients, design of retardation conditions is very complicated. Accordingly, the significance of the optimal retardation R3 being calculable using the mean value Nzq is extremely great.

(Compensation Principle in 2nd Step)

First, let us consider a case of observing the liquid crystal display device 200 in FIG. 5 after completing the 1st step from a direction inclined 60 degrees in an azimuthal direction for dividing the azimuthal direction 90 degrees of the absorption axis of the first polarizer 210 and the azimuthal direction 0 degrees of the absorption axis of the second polarizer 250 in half (hereinafter, also referred to as azimuthal direction 45 degrees). As described above, in the 1st step, with the liquid crystal display device 200, according to the Nz coefficient NzQ1 of the first λ/4 plate 220 and the Nz coefficient NzQ2 of the second λ/4 plate 240, the optimal values of the thickness direction retardation Rlc of the liquid crystal cell 230 and the thickness direction retardation R3 of the third-type birefringent layer 235 are selected, and optical compensation in the azimuthal direction 0 degrees is performed. Under this condition, when illustrating a polarization state each time light emitted from the backlight transmits through each of the polarizers 210 and 250, each of the birefringent layers 220, 240, and 235, and the liquid crystal cell 230 using an S1-S2 plane of the Poincare sphere, this becomes as illustrated in FIG. 9.

First, a polarization state immediately after transmitting through the first polarizer 210 is located in a point P0 on the Poincare sphere, and does not agree with a polarization state in which the second polarizer 250 represented with a point E can be absorbed, that is, an extinction point (the azimuthal direction of the absorption axis) of the second polarizer 250. In the oblique direction of the azimuthal direction 45 degrees, the first and second polarizers 210 and 250 are not mutually orthogonal, this suggests that optical compensation is needed. The light is subjected to rotation transformation of a particular angle with the slow axis of the first λ/4 plate 220 represented with a point Q1 on the Poincare sphere as the center by transmitting through the first λ/4 plate 220, and the polarization state located in the point P0 reaches a point P1. A rotation direction at this time is counterclockwise as viewed from the point Q1 toward the origin O.

Next, the light is subjected to rotation transformation of a particular angle with the slow axis of the third-type birefringent layer 235 represented with a point R3 on the Poincare sphere as the center by transmitting through the third-type birefringent layer 235, and the polarization state reaches a point P2. A rotation direction at this time is counterclockwise as viewed from the point R3 toward the origin O. Next, the light is subjected to rotation transformation of a particular angle with the slow axis of the liquid crystal cell 230 represented with a point L on the Poincare sphere as the center by transmitting through the VA mode liquid crystal cell 230, and the polarization state reaches a point P3. A rotation direction at this time is counterclockwise as viewed from the point L toward the origin O. Finally, the light is subjected to rotation transformation of a particular angle with the slow axis of the second λ/4 plate 240 represented with a point Q2 as the center by transmitting through the second λ/4 plate 240, and the polarization state reaches a point P4. This point P4 does not agree with the extinction point E of the second polarizer 250. In this manner, the liquid crystal display device 200 in FIG. 5 cannot shield the light from the backlight as observed from the oblique direction with the azimuthal direction 45 degrees and polar 60 degrees. That is to say, with the liquid crystal display device 200 which has completed the 1st step alone, optical compensation has not been performed in the azimuthal direction 45 degrees.

Note that the positions of the points P1 to P4 in FIG. 9 depend on the Nz coefficient NzQ1 of the first λ/4 plate 220, the Nz coefficient NzQ2 of the second λ/4 plate 240, the thickness direction retardation R3 of the third-type birefringent layer 235, and the thickness direction retardation Rlc of the liquid crystal cell 230, but FIG. 9 illustrates a mode with the Nzq1=Nzq2=2.0, R3=−61 nm, and the Rlc=320 nm as an example. In order to make transformation of a polarization state understandable, the position of each point is roughly illustrated, and there is included information that is inaccurate in a precise sense. Also, in order to clearly illustrate the drawings, no arrow representing a locus is illustrated regarding transformation of the points P1 to P4.

Next, as illustrated in FIG. 10, let us consider a circularly-polarized VA mode liquid crystal display device 300 including a second-type birefringent layer, in which a first polarizer (the azimuthal direction 90 degrees of an absorption axis) 310, a second-type birefringent layer (the azimuthal direction 0 degrees of a fast axis) 315, a first λ/4 plate (the azimuthal direction 135 degrees of a slow axis) 320, a third-type birefringent layer 335, a VA mode liquid crystal cell 330, a second λ/4 plate (the azimuthal direction 45 degrees of a slow axis) 340, and a second polarizer (the azimuthal direction 0 degrees of an absorption axis) 350 are laminated in this order. The second-type birefringent layer is added to the configuration in FIG. 5 so as to perform optical compensation in the azimuthal direction 45 degrees. Note that in FIG. 10, arrows drawn in the first and second polarizers 310 and 350 represent the azimuthal directions of the absorption axes thereof, and arrows drawn in the first and second λ/4 plates 320 and 340 represent the azimuthal directions of the slow axes thereof, an arrow drawn in the second-type birefringent layer 315 represents the azimuthal direction of a fast axis thereof, and ellipsoids drawn in the VA mode liquid crystal cell 330 and third-type birefringent layer 335 represent the shape of index ellipsoids thereof.

First, let us consider a polarization state in the event of observing the circularly-polarized VA mode liquid crystal display device 300 in FIG. 10 from the front direction. When illustrating a polarization state each time light emitted from a backlight (though not illustrated in FIG. 10, located below the first polarizer 310) transmits through each of the polarizers 310 and 350, each of the birefringent layers 320, 340, 335, and 315, and the liquid crystal cell 330 using an S1-S2 plane of the Poincare sphere, this becomes as illustrated in FIG. 11.

First, a polarization state immediately after transmitting through the first polarizer 310 is located in a point P0 on the Poincare sphere, and agrees with a polarization state in which the second polarizer 350 represented with a point E can be absorbed, that is, an extinction point (the azimuthal direction of the absorption axis) of the second polarizer 350. The light transmits through the second-type birefringent layer 315, but the polarization state is not changed from the point P0 even when being subjected to rotation transformation of a particular angle with the fast axis of the second-type birefringent layer 315 represented with a point R2 on the Poincare sphere as the center. Next, the light is subjected to rotation transformation of a particular angle with the slow axis of the first λ/4 plate 320 represented with a point Q1 on the Poincare sphere as the center by transmitting through the first λ/4 plate 320, and the polarization state located in the point P0 reaches a point P1. A rotation direction at this time is counterclockwise as viewed from the point Q1 toward the origin O.

Next, the light transmits through the third-type birefringent layer 335 and VA mode liquid crystal cell 330, but the retardations of both of third-type birefringent layer 335 and VA mode liquid crystal cell 330 are zero in the front direction, and accordingly, the polarization state is not changed. Finally, the light is subjected to rotation transformation of a particular angle with the slow axis of the second λ/4 plate 340 represented with a point Q2 as the center by transmitting through the second λ/4 plate 340, and the polarization state reaches a point P2. This point P2 agrees with the extinction point E of the second polarizer 350. In this manner, the liquid crystal display device 300 in FIG. 10 can shield the light from the backlight as observed from the front direction in the same way as with the liquid crystal display device 100 in FIG. 1, and good black display is obtained.

Now, let us consider a polarization state in the event of observing the circularly-polarized VA mode liquid crystal device 300 in FIG. 10 from a direction inclined 60 degrees in the azimuthal direction 45 degrees. Under this condition, when illustrating a polarization state each time light emitted from the backlight transmits through each of the polarizers 310 and 350, each of the birefringent layers 320, 340, 335, and 315, and the liquid crystal cell 330 using an S1-S2 plane of the Poincare sphere, this becomes as illustrated in FIG. 12.

First, a polarization state immediately after transmitting through the first polarizer 310 is located in a point P0 on the Poincare sphere, and does not agree with a polarization state in which the second polarizer 350 represented with a point E can be absorbed, that is, an extinction point (the azimuthal direction of the absorption axis) of the second polarizer 350. The light then is subjected to rotation transformation of a particular angle with the fast axis of the second-type birefringent layer 315 represented with a point R2 on the Poincare sphere as the center by transmitting through the second-type birefringent layer 315, and the polarization state reaches a point P1. A rotation direction at this time is clockwise as viewed from the point R2 toward the origin O. Note that the point P1 exists on the south hemisphere of the Poincare sphere (S3<0), but in order to make the drawing more readily understandable, the point P1 is illustrated in the same way as other points (points existing on the north hemisphere or equator) in FIG. 12. Next, the polarization state at point P1 is subjected to rotation transformation of a particular angle with the slow axis of the first λ/4 plate 320 represented with a point Q1 on the Poincare sphere as the center by transmitting through the first λ/4 plate 320, and the polarization state reaches a point P2. A rotation direction at this time is counterclockwise as viewed from the point Q1 toward the origin O.

Next, the light is subjected to rotation transformation of a particular angle with the slow axis of the third-type birefringent layer 335 represented with a point R3 on the Poincare sphere as the center by transmitting through the third-type birefringent layer 335, and the polarization state reaches a point P3. A rotation direction at this time is counterclockwise as viewed from the point R3 toward the origin O. Next, the light is subjected to rotation transformation of a particular angle with the slow axis of the liquid crystal cell 330 represented with a point L on the Poincare sphere as the center by transmitting through the VA mode liquid crystal cell 330, and the polarization state reaches a point P4. A rotation direction at this time is counterclockwise as viewed from the point L toward the origin O. Finally, the light is subjected to rotation transformation of a particular angle with the slow axis of the second λ/4 plate 340 represented with a point Q2 as the center by transmitting through the second λ/4 plate 340, and the polarization state reaches a point P5. This point P5 agrees with the extinction point E of the second polarizer 350. In this manner, the liquid crystal display device 300 in FIG. 10 can shield the light from the backlight as observed from the oblique direction with the azimuthal direction 45 degrees and polar 60 degrees in the same way as observed from the front direction.

Finally, let us consider a polarization state in the event of observing the circularly-polarized VA mode liquid crystal display device 300 in FIG. 10 from a direction inclined 60 degrees in the azimuthal direction 0 degrees. Under this condition, when illustrating a polarization state each time light emitted from the backlight transmits through each of the polarizers 310 and 350, each of the birefringent layers 320, 340, 335, and 315, and the liquid crystal cell 330 using an S1-S2 plane of the Poincare sphere, this becomes as illustrated in FIG. 13.

First, a polarization state immediately after transmitting through the first polarizer 310 is located in a point P0 on the Poincare sphere, and agrees with a polarization state in which the second polarizer 350 represented with a point E can be absorbed, that is, an extinction point (the azimuthal direction of the absorption axis) of the second polarizer 350. The light transmits through the second-type birefringent layer 315, but the polarization state is not changed from the point P0 even when being subjected to rotation transformation of a particular angle with the fast axis of the second-type birefringent layer 315 represented with a point R2 on the Poincare sphere as the center. Next, the light is subjected to rotation transformation of a particular angle with the slow axis of the first λ/4 plate 320 represented with a point Q1 on the Poincare sphere as the center by transmitting through the first λ/4 plate 320, and the polarization state located in the point P0 reaches a point P1. A rotation direction at this time is counterclockwise as viewed from the point Q1 toward the origin O.

Next, the light is subjected to rotation transformation of a particular angle with the slow axis of the third-type birefringent layer 335 represented with a point R3 on the Poincare sphere as the center by transmitting through the third-type birefringent layer 335, and the polarization state reaches a point P2. A rotation direction at this time is counterclockwise as viewed from the point R3 toward the origin O. Next, the light is subjected to rotation transformation of a particular angle with the slow axis of the liquid crystal cell 330 represented with a point L on the Poincare sphere as the center by transmitting through the VA mode liquid crystal cell 330, and the polarization state reaches a point P3. A rotation direction at this time is counterclockwise as viewed from the point L toward the origin O. Finally, the light is subjected to rotation transformation of a particular angle with the slow axis of the second λ/4 plate 340 represented with a point Q2 as the center by transmitting through the second λ/4 plate 340, and the polarization state reaches a point P4. This point P4 agrees with the extinction point E of the second polarizer 350. In this manner, the liquid crystal display device 300 in FIG. 10 can shield the light from the backlight as observed from the oblique direction with the azimuthal direction 0 degrees and polar 60 degrees, in the same way as with the case of observing from the front direction, and good black display is obtained.

In this manner, the liquid crystal display device 300 in FIG. 10 which has completed the 2nd step can shield the light from the backlight in all of the front direction, the oblique direction with the azimuthal direction 0 degrees, and the oblique direction with the azimuthal direction 45 degrees, and good black display is obtained.

Note that the positions of the points P1 to P5 in FIG. 11, FIG. 12, and FIG. 13 depend on an Nz coefficient NzQ1 of the first λ/4 plate 320, an Nz coefficient NzQ2 of the second λ/4 plate 340, thickness direction retardation R3 of the third-type birefringent layer 335, thickness direction retardation Rlc of the liquid crystal cell 330, and an Nz coefficient Nz2 and in-plane retardation R2 of the second-type birefringent layer 315, but FIG. 11, FIG. 12, and FIG. 13 illustrate a mode with the Nzq1=Nzq2=2.0, R3=−61 nm, Rlc=320 nm, Nz2=−0.30, and R2=118 nm as an example. In order to make transformation of a polarization state understandable, the position of each point is roughly illustrated, and there is included information that is inaccurate in a precise sense. Also, in order to clearly illustrate the drawings, no arrow representing a locus is illustrated regarding transformation of the points P1 to P5.

As a result of the present inventor's study, it has been proven that according to the Nz coefficient NzQ1 of the first λ/4 plate 320, and the Nz coefficient NzQ2 of the second λ/4 plate 340, there is the optimal Nz coefficient Nz2 and retardation value R2 of the second-type birefringent layer 315.

Now, Table 3, FIG. 14, and FIG. 8 illustrate results investigated by computer simulation regarding a relation of the Nz coefficient NzQ1 of the first λ/4 plate 320, the Nz coefficient NzQ2 of the second λ/4 plate 340, optimal values of the Nz coefficient Nz2 and in-plane retardation R2 of the second-type birefringent layer 315. Also, for simplicity, computer simulation has been preformed here assuming that the Nz coefficient NzQ1 of the first λ/4 plate 320 and the Nz coefficient NzQ2 of the second λ/4 plate 340 are the same (Nzq1=Nzq2=Nzq), but even when the Nz coefficient Nzq1 of the first λ/4 plate 320 and the Nz coefficient NzQ2 of the second λ/4 plate 340 mutually differ, the optimal values of the Nz coefficient Nz2 and in-plane retardation R2 of the second-type birefringent layer 315 may be calculated by assuming that each of the NzQ1 and NzQ2 is equal to a mean value Nzq thereof, and according to the Nzq thereof, and it has been found by the present inventor that the results of Table 3, FIG. 14, and FIG. 15 can be referenced without change. This reason is the same as with the case described with reference to FIG. 7-6 and so forth, and accordingly, description thereof will be omitted. As can be understood from Table 3, FIG. 14, and FIG. 15, though a relation between the mean value Nzq and the optimal Nz2 and R2 is not simple, the following Expressions (B) and (C) provide sufficiently good approximation in a range of 1.0≤Nzq≤2.9. A solid line illustrated in FIG. 14 and FIG. 15 represents the Expressions (B) and (C) thereof.

$$Nz2 = -0.63 \times Nzq^2 + 0.56 \times Nzq + 0.40 \quad (B)$$

$$R2 = 43\ \text{nm} \times Nzq^2 - 226\ \text{nm} \times Nzq + 370\ \text{nm} \quad (C)$$

From a perspective of realizing liquid crystal display having a high contrast ratio over a wide view angle range, it is most desirable that the Nz2 and R2 of the second-type birefringent layer 315 described above be the optimal values illustrated in Table 3, FIG. 14, and FIG. 15, but as long as a range where a contrast ratio at an oblique view angle is not significantly deteriorated, the Nz2 and R2 may somewhat deviates from the optimal value. From a perspective of exhibiting operational advantages of the liquid crystal display device of the present invention, the Nz2 is preferably a range of the optimal value±0.80. The R2 is preferably a range of the optimal value±50 nm. Note that, when treating the Nz coefficient NzQ1 and Nz coefficient NzQ2 as individual independent coefficients, design of retardation conditions is very complicated. Accordingly, the significance of the optimal Nz2 and R2 being calculable using the mean value Nzq is extremely great.

Also, according to Table 3 and FIG. 14, in a range of Nzq<1.40, the optimal value of the Nz2 is included in a range of 0<Nz2<1. A birefringent layer that indicates an Nz coefficient within this range is a biaxial retardation film satisfying a relation of nx>nz>ny, and does not correspond to a second-type birefringent layer, and is a high-cost film of which manufacturing is harder than a second-type birefringent layer. Note that, in order to solve this point, it is desirable to satisfy 1.40≤Nzq. The present inventor has studied a method to realize liquid crystal display having a high contrast ratio over a wide view angle range with lower cost and also a convenient manner regarding a range of Nzq<1.40. As a result thereof, the present inventor has found that, with a range of Nzq<1.40, instead of a birefringent layer satisfying the optimal Nz2 and R2 illustrated in Table 3, FIG. 14, and FIG. 15, if a second-type birefringent layer with Nz2=0 and R2=138 nm is employed, the same operational advantages can be exhibited. For example, with each example of Nzq=1.00, 1.10, 1.20, and 1.30, when the optimal R2 was calculated by fixing Nz2=0, 138 nm was obtained in all examples regardless of Nzq. From a perspective of sufficiently exhibiting operational advantages of the liquid crystal display device of the present invention, it is desirable to satisfy −0.80≤Nz2≤0 (a range of equal to or greater than the optimal value −0.80 but less than 0 (=optimal value)), and also to satisfy 88 nm≤R2≤188 nm (optimal value in a range of 138 nm±50 nm).

TABLE 3

| Nzq | Nz2 | R2 (nm) |
| --- | --- | --- |
| 1.00 | 0.35 | 186 |
| 1.10 | 0.25 | 169 |
| 1.20 | 0.15 | 154 |
| 1.30 | 0.10 | 148 |
| 1.40 | −0.05 | 134 |
| 1.50 | −0.15 | 127 |
| 1.60 | −0.30 | 118 |
| 1.70 | −0.45 | 111 |
| 2.00 | −1.00 | 94 |
| 2.30 | −1.65 | 81 |
| 2.40 | −1.90 | 78 |

TABLE 3-continued

| Nzq | Nz2 | R2 (nm) |
|---|---|---|
| 2.50 | −2.15 | 75 |
| 2.90 | −3.20 | 66 |

The liquid crystal display device of the present invention, and preferable typical modes in the liquid crystal display device of the present invention will be shown below.

(Appendix 1)

A liquid crystal display device including, when defining that a birefringent layer satisfying a relation of nx>ny≥nz is a first-type birefringent layer, and a birefringent layer satisfying a relation of nx<ny≤nz is a second-type birefringent layer: a first polarizer; a second-type birefringent layer; a first first-type birefringent layer of which the in-plane retardation has been adjusted to λ/4; a liquid crystal cell having a pair of substrates which mutually face, and having a liquid crystal layer sandwiched between this pair of substrates; a second first-type birefringent layer having an Nz coefficient different from an Nz coefficient of the first first-type birefringent layer, of which the in-plane retardation has been adjusted to λ/4; and a second polarizer in this order, wherein an in-plane slow axis of the first first-type birefringent layer forms an angle of generally 45 degrees as to an absorption axis of the first polarizer, an in-plane slow axis of the second first-type birefringent layer is generally orthogonal to the in-plane slow axis of the first first-type birefringent layer, an absorption axis of the second polarizer is generally orthogonal to the absorption axis of the first polarizer, an in-plane fast axis of the second-type birefringent layer is generally orthogonal to the absorption axis of the first polarizer, and black display is performed by aligning liquid crystal molecules within the liquid crystal layer in a manner generally perpendicular to the substrate surfaces.

(Appendix 2)

The liquid crystal display device according to Appendix 1, wherein one Nz coefficient of the first first-type birefringent layer and the second first-type birefringent layer is equal to or greater than 2, and the other Nz coefficient of the first first-type birefringent layer and the second first-type birefringent layer is equal to or greater than 1 but less than 2.

(Appendix 3)

The liquid crystal display device according to Appendix 1 or 2, wherein, of the, first and second first-type birefringent layers, one having a greater Nz coefficient is disposed on the rear face side of the liquid crystal cell.

(Appendix 4)

The liquid crystal display device according to any of Appendixes 1 to 3, wherein the second-type birefringent layer is disposed on the rear face side of the liquid crystal cell.

(Appendix 5)

The liquid crystal display device according to Appendix 4, wherein the Nz coefficient of the first first-type birefringent layer is greater than the Nz coefficient of the second first-type birefringent layer, and the second-type birefringent layer and the first first-type birefringent layer are disposed on the rear face side of the liquid crystal cell.

(Appendix 6)

The liquid crystal display device according to any of Appendixes 1 to 5, further including: a surface treatment layer on the observation face side of the second polarizer, wherein the Nz coefficient of the first first-type birefringent layer is greater than the Nz coefficient of the second first-type birefringent layer.

(Appendix 7)

The liquid crystal display device according to any of Appendixes 1 to 6, further including, when defining that a birefringent layer satisfying a relation of nx≈ny≥nz is a third-type birefringent layer: at least one third-type birefringent layer at least between the first first-type birefringent layer and the liquid crystal cell or between the liquid crystal cell and the second first-type birefringent layer.

(Appendix 8)

The liquid crystal display device according to Appendix 7, wherein at least the one third-type birefringent layer is disposed on the rear face side of the liquid crystal cell.

(Appendix 9)

The liquid crystal display device according to Appendix 8, wherein the Nz coefficient of the first first-type birefringent layer is greater than the Nz coefficient of the second first-type birefringent layer, and the second-type birefringent layer, the first first-type birefringent layer, and at least the one third-type birefringent layer are disposed on the rear face side of the liquid crystal cell.

(Appendix 10)

The liquid crystal display device according to any of Appendixes 7 to 9 satisfying the following Expressions (1) to (3) when defining that a mean value of the Nz coefficients of the first and second first-type birefringent layers is Nzq, thickness direction retardation at the time of black display of the liquid crystal cell is Rlc, and summation of the thickness direction retardation of at least the one third-type birefringent layer is R3.

$$1.0 \leq Nzq \leq 2.9 \qquad (1)$$

$$(169 \text{ nm} \times Nzq - 81 \text{ nm}) - 50 \text{ nm} \leq Rlc + R3 \qquad (2)$$

$$Rlc + R3 \leq (169 \text{ nm} \times Nzq - 81 \text{ nm}) + 50 \text{ nm} \qquad (3)$$

(Appendix 11)

The liquid crystal display device according to Appendix 10 satisfying the following Expressions (4) to (7) when defining that an Nz coefficient of the second-type birefringent layer is Nz2, and in-plane retardation thereof is R2.

$$(-0.63 \times Nzq^2 + 0.56 \times Nzq + 0.40) - 0.80 \leq Nz2 \qquad (4)$$

$$Nz2 \leq (-0.63 \times Nzq^2 + 0.56 \times Nzq + 0.40) + 0.80 \qquad (5)$$

$$(43 \text{ nm} \times Nzq^2 - 226 \text{ nm} \times Nzq + 370 \text{ nm}) - 50 \text{ nm} \leq R2 \qquad (6)$$

$$R2 \leq (43 \text{ nm} \times Nzq^2 - 226 \text{ nm} \times Nzq + 370 \text{ nm}) + 50 \text{ nm} \qquad (7)$$

(Appendix 12)

The liquid crystal display device according to Appendix 11 satisfying $1.40 \leq Nzq$.

(Appendix 13)

The liquid crystal display device according to any of Appendixes 7 to 10 satisfying $Nzq<1.40$, satisfying $-0.80 \leq Nz2 \leq 0$, and also satisfying 88 nm $\leq R2 \leq$ 188 nm when defining that a mean value of the Nz coefficients of the first and second first-type birefringent layers is Nzq, an Nz coefficient of the second-type birefringent layer is Nz2, and in-plane retardation thereof is R2.

(Appendix 14)

The liquid crystal display device according to any of Appendixes 1 to 6 comprising, when defining that a birefringent layer satisfying a relation of nx≈ny≥nz is a third-type birefringent layer, no third-type birefringent layer between the first first-type birefringent layer and the liquid crystal cell and between the liquid crystal cell and the second first-type birefringent layer.

(Appendix 15)

The liquid crystal display device according to Appendix 14 satisfying the following Expressions (1), (8) and (9) when defining that a mean value of the Nz coefficients of the first and second first-type birefringent layers is Nzq, and thickness direction retardation at the time of black display of the liquid crystal cell is Rlc.

$$1.0 \leq Nzq \leq 2.9 \quad (1)$$

$$(169 \text{ nm} \times Nzq - 81 \text{ nm}) - 50 \text{ nm} \leq Rlc \quad (8)$$

$$Rlc \leq (169 \text{ nm} \times Nzq - 81 \text{ nm}) + 50 \text{ nm} \quad (9)$$

(Appendix 16)

The liquid crystal display device according to Appendix 15 satisfying the following Expressions (4) to (7) when defining that an Nz coefficient of the second-type birefringent layer is Nz2, and in-plane retardation thereof is R2.

$$(-0.63 \times Nzq^2 + 0.56 \times Nzq + 0.40) - 0.80 \leq Nz2 \quad (4)$$

$$Nz2 \leq (-0.63 \times Nzq^2 + 0.56 \times Nzq + 0.40) + 0.80 \quad (5)$$

$$(43 \text{ nm} \times Nzq^2 - 226 \text{ nm} \times Nzq + 370 \text{ nm}) - 50 \text{ nm} \leq R2 \quad (6)$$

$$R2 \leq (43 \text{ nm} \times Nzq^2 - 226 \text{ nm} \times Nzq + 370 \text{ nm}) + 50 \text{ nm} \quad (7)$$

(Appendix 17)

The liquid crystal display device according to Appendix 16 satisfying $1.40 \leq Nzq$.

(Appendix 18)

The liquid crystal display device according to any of Appendix 14 or 15 satisfying $Nzq < 1.40$, satisfying $-0.80 \leq Nz2 \leq 0$, and also satisfying 88 nm $\leq R2 \leq 188$ nm when defining that a mean value of the Nz coefficients of the first and second first-type birefringent layers is Nzq, an Nz coefficient of the second-type birefringent layer is Nz2, and in-plane retardation thereof is R2.

(Appendix 19)

The liquid crystal display device according to any of Appendixes 7 to 13 satisfying $Nzq < 2.00$ when defining that a mean value of the Nz coefficients of the first and second first-type birefringent layers is Nzq.

(Appendix 20)

The liquid crystal display device according to any of Appendixes 14 to 18 satisfying $2.00 \leq Nzq$ when defining that a mean value of the Nz coefficients of the first and second first-type birefringent layers is Nzq.

The above modes may be combined as appropriate without departing essence of the present invention. Further, a mode which mutually combined two or more favorable modes is also one of favorable modes.

Advantageous Effects of Invention

According to the present invention, there can be provided a liquid crystal display device which enables costs to be reduced, excels in productivity, and enables a high contrast ratio over a wide viewing angle range to be realized. This liquid crystal display device can preferably be employed for a display device such as an outdoor signage display or the like.

BRIEF DESCRIPTION OF DRAWINGS

FIG. 2 (a) is a schematic view (upper) as viewed from the front direction and a schematic view (lower) as viewed from the oblique direction with the azimuthal direction 0 degrees regarding a slow axis of a first λ/4 plate and a slow axis of a second λ/4 plate which are orthogonal in the front direction. (b) is a schematic view (upper) as viewed from the front direction and a schematic view (lower) as viewed from the oblique direction with the azimuthal direction 45 degrees regarding a slow axis of a first λ/4 plate and a slow axis of a second λ/4 plate which are orthogonal in the front direction. (c) is a schematic view (upper) as viewed from the front direction and a schematic view (lower) as viewed from the oblique direction with the azimuthal direction 45 degrees regarding an absorption axis of a first polarizer and an absorption axis of a second polarizer which are orthogonal in the front direction.

FIG. 7-1 is a diagram illustrating a way in which a polarization state of transmitted light is changed each time the transmitted light passes through each member regarding the circularly-polarized VA mode liquid crystal display device in FIG. 5 (mode with Nzq1=Nzq2=2.0, R3=−61 nm, and Rlc=320 nm) as viewed from the oblique direction with the azimuthal direction 0 degrees and polar 60 degrees by being projected on an S1-S2 plane of a Poincare sphere.

FIG. 7-2 is a diagram illustrating a way in which a polarization state of transmitted light is changed each time the transmitted light passes through each member regarding the circularly-polarized VA mode liquid crystal display device in FIG. 5 (mode with Nzq1=3.0, Nzq2=1.0, R3=−61 nm, and Rlc=320 nm) as viewed from the oblique direction with the azimuthal direction 0 degrees and polar 60 degrees by being projected on an S1-S2 plane of a Poincare sphere.

FIG. 7-3 is a diagram illustrating a way in which a polarization state of transmitted light is changed each time the transmitted light passes through each member regarding the circularly-polarized VA mode liquid crystal display device in FIG. 5 (mode with Nzq1=2.5, Nzq2=1.5, R3=−61 nm, and Rlc=320 nm) as viewed from the oblique direction with the azimuthal direction 0 degrees and polar 60 degrees by being projected on an S1-S2 plane of a Poincare sphere.

FIG. 7-4 is a diagram illustrating a way in which a polarization state of transmitted light is changed each time the transmitted light passes through each member regarding the circularly-polarized VA mode liquid crystal display device in FIG. 5 (mode with Nzq1=1.0, Nzq2=3.0, R3=−61 nm, and Rlc=320 nm) as viewed from the oblique direction with the azimuthal direction 0 degrees and polar 60 degrees by being projected on an S1-S2 plane of a Poincare sphere.

FIG. 7-5 is a diagram illustrating a way in which a polarization state of transmitted light is changed each time the transmitted light passes through each member regarding the circularly-polarized VA mode liquid crystal display device in FIG. 5 (mode with Nzq1=1.5, Nzq2=2.5, R3=−61 nm, and Rlc=320 nm) as viewed from the oblique direction with the azimuthal direction 0 degrees and polar 60 degrees by being projected on an S1-S2 plane of a Poincare sphere.

FIG. 7-6 is a diagram illustrating a way in which slow axes of first and second λ/4 plates are changed depending on Nz coefficients regarding the circularly-polarized VA mode liquid crystal display device in FIG. 5 as viewed from the oblique direction with the azimuthal direction 0 degrees and polar 60 degrees by being projected on an S1-S2 plane of a Poincare sphere.

DESCRIPTION OF EMBODIMENTS (Birefringent Layers)

Figure 1:
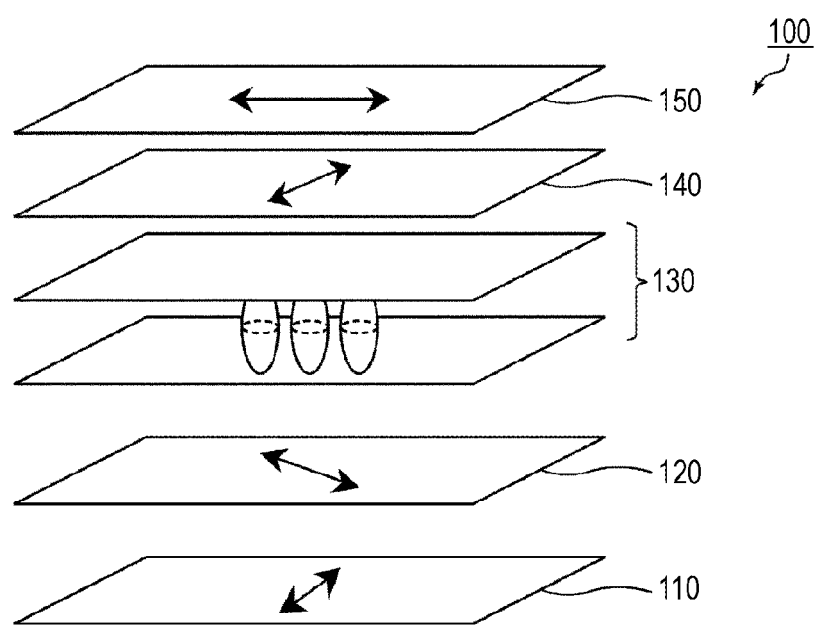
FIG. 1 is a perspective exploded view illustrating a configuration of a circularly-polarized VA mode liquid crystal display device made up of the simplest configuration excluding second-type and third-type birefringent layers.
Figure 3:
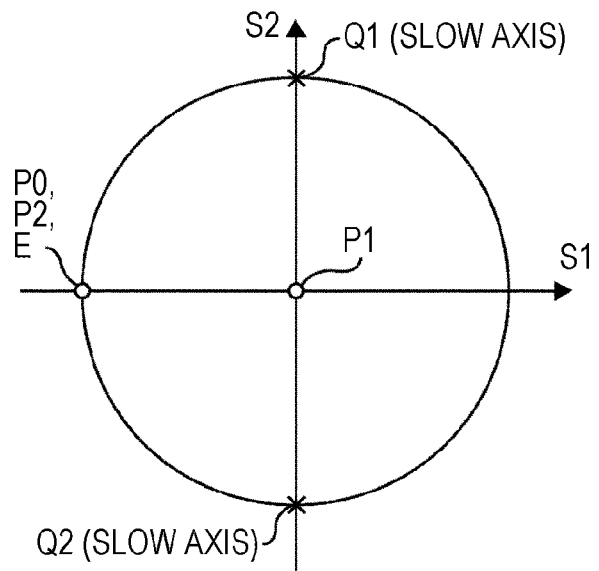
FIG. 3 is a diagram illustrating a way in which a polarization state of transmitted light is changed each time the transmitted light passes through each member regarding the circularly-polarized VA mode liquid crystal display device in FIG. 1 as viewed from the front direction by being projected on an S1-S2 plane of a Poincare sphere.
Figure 4:
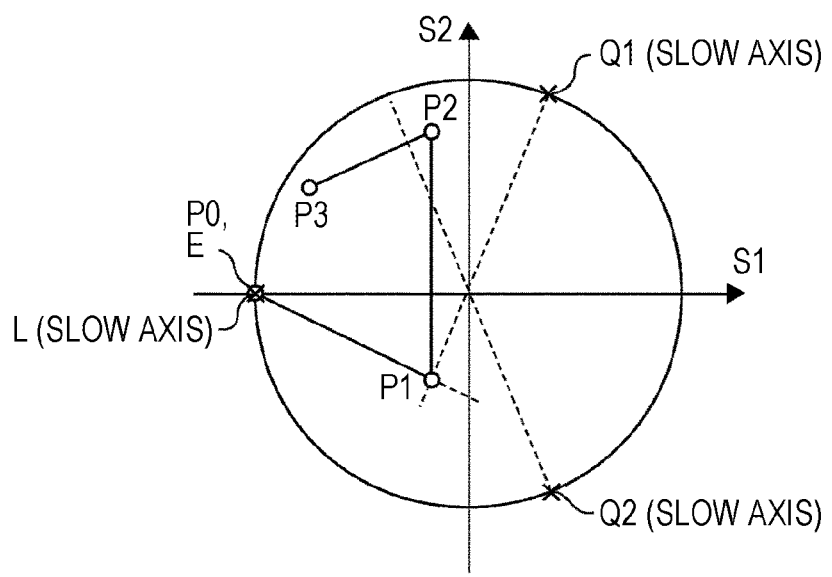
FIG. 4 is a diagram illustrating a way in which a polarization state of transmitted light is changed each time the transmitted light passes through each member regarding the circularly-polarized VA mode liquid crystal display device in FIG. 1 as viewed from the oblique direction with the azimuthal direction 0 degrees and polar 60 degrees by being projected on an S1-S2 plane of a Poincare sphere.
Figure 5:
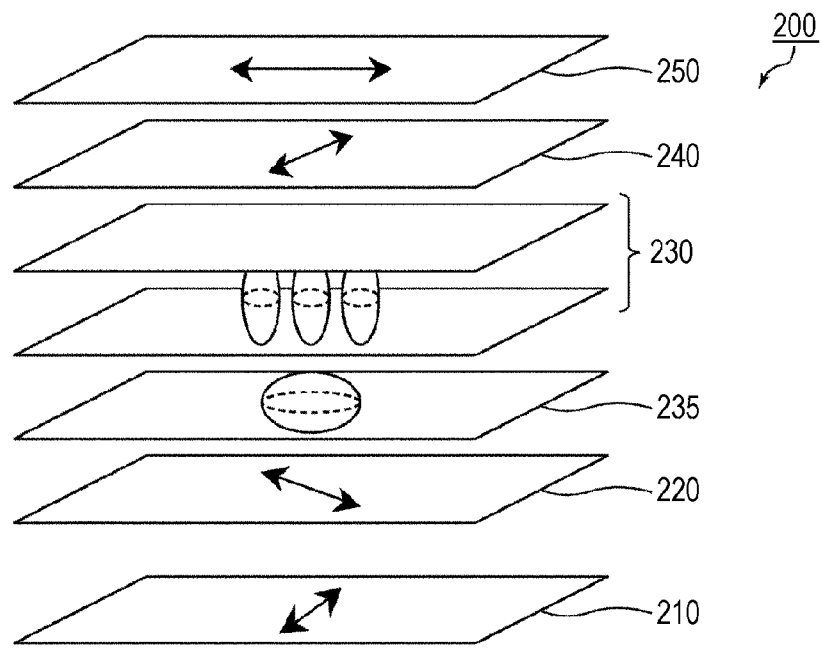
FIG. 5 is a perspective exploded view illustrating a configuration of a circularly-polarized VA mode liquid crystal display device including a third-type birefringent layer.
Figure 6:
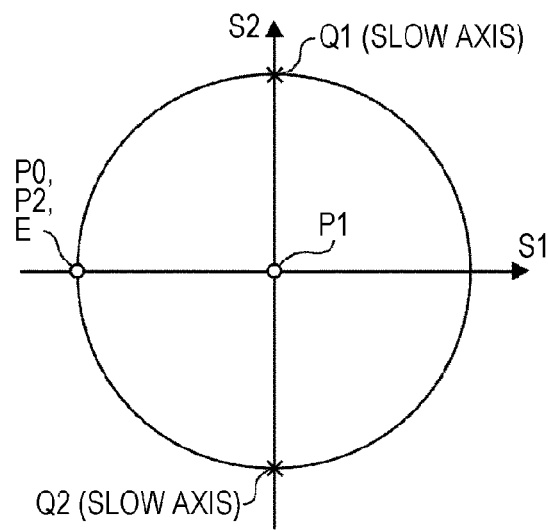
FIG. 6 is a diagram illustrating a way in which a polarization state of transmitted light is changed each time the transmitted light passes through each member regarding the circularly-polarized VA mode liquid crystal display device in FIG. 5 (mode with Nzq1=Nzq2=2.0, R3=−61 nm, and Rlc=320 nm) as viewed from the front direction by being projected on an S1-S2 plane of a Poincare sphere.
Figures 1, 7:
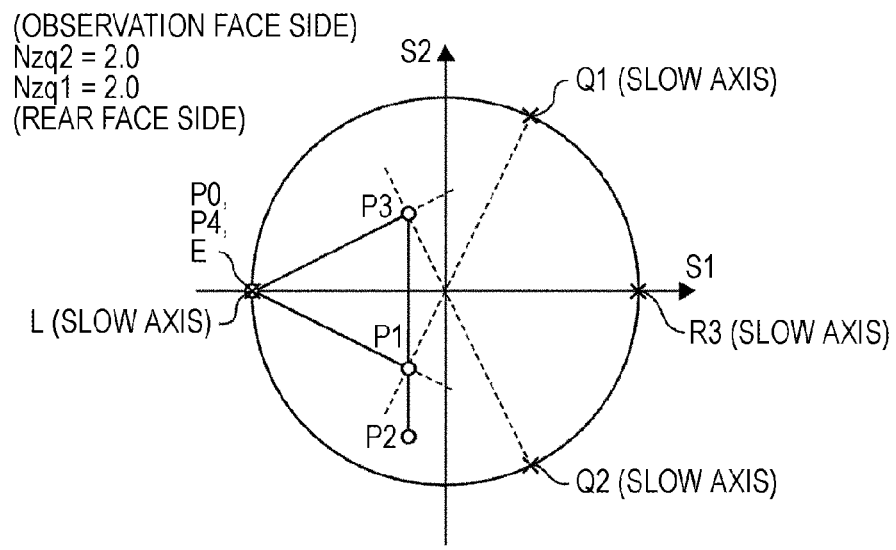
Figures 2, 7:
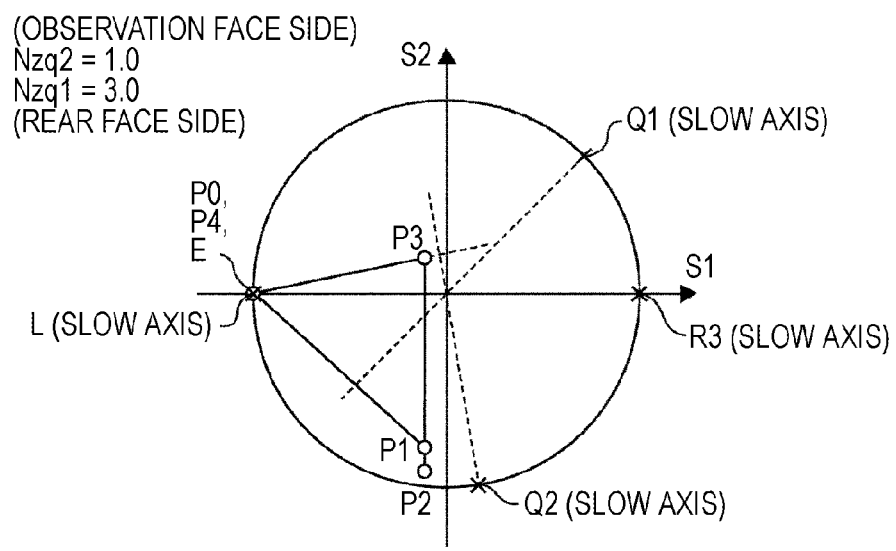
Figures 3, 7:
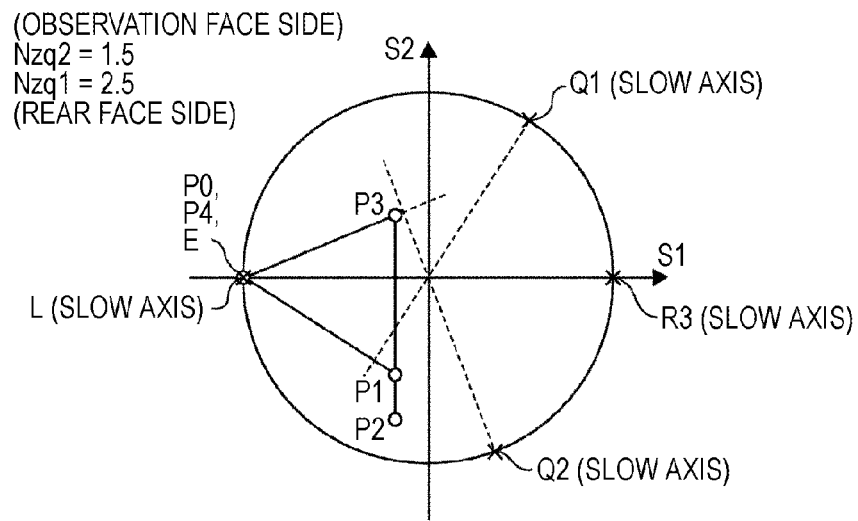
Figures 4, 7:
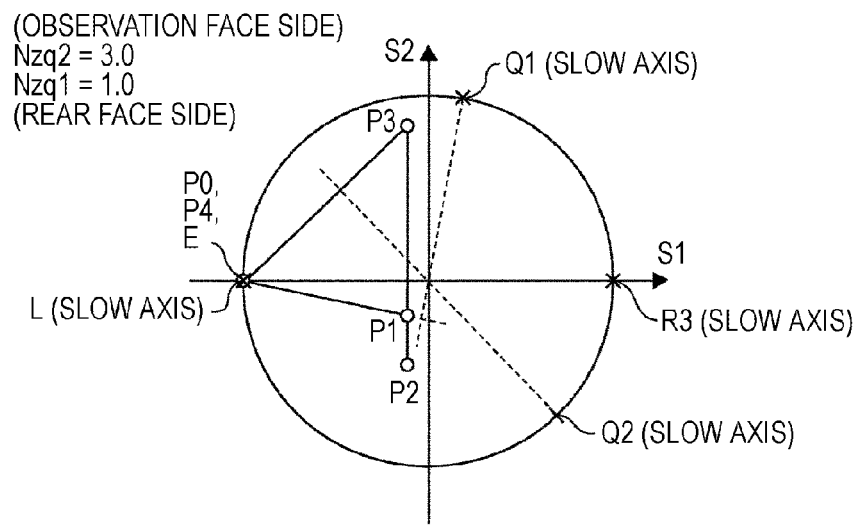
Figures 5, 7:
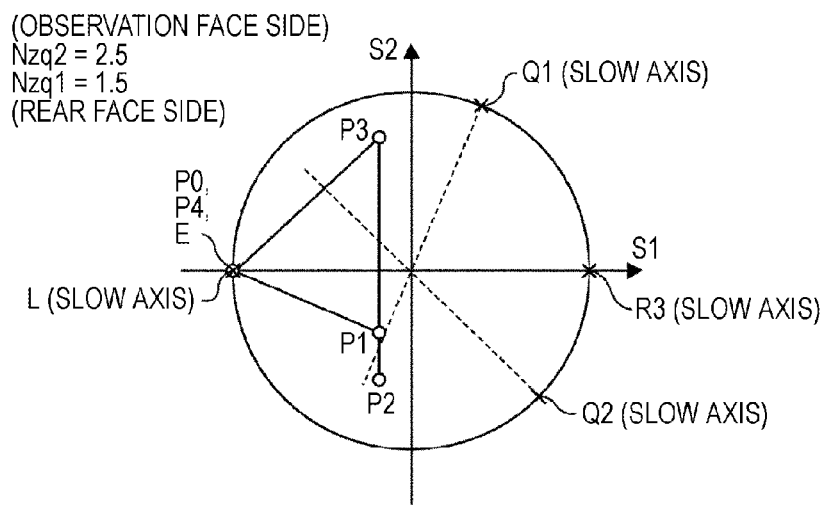
Figures 6, 7:
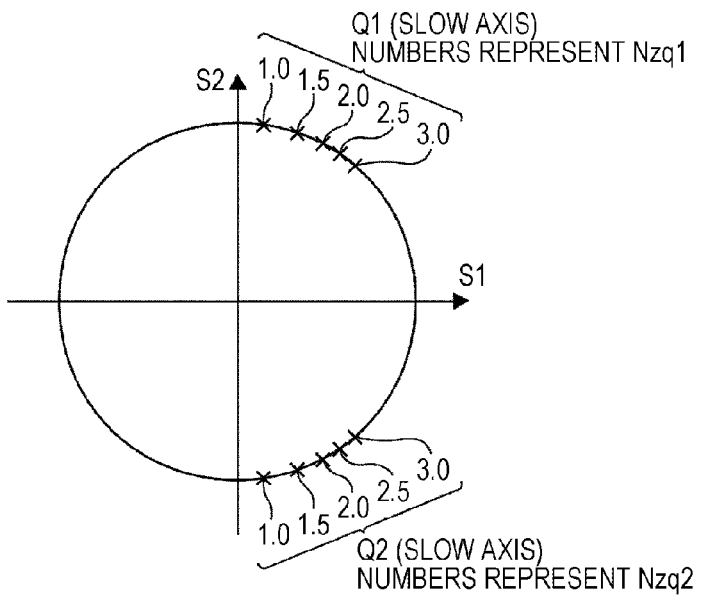
Figure 8:
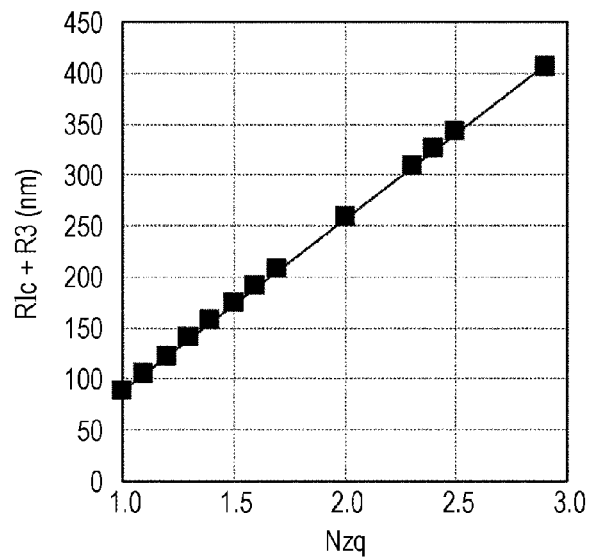
FIG. 8 is a graph illustrating a relation of a mean value Nzq of the Nz coefficients of first and second λ/4 plates, and an optimal value of thickness direction retardation R3 of a third-type birefringent layer regarding the circularly-polarized VA mode liquid crystal display device in FIG. 5.
Figure 9:
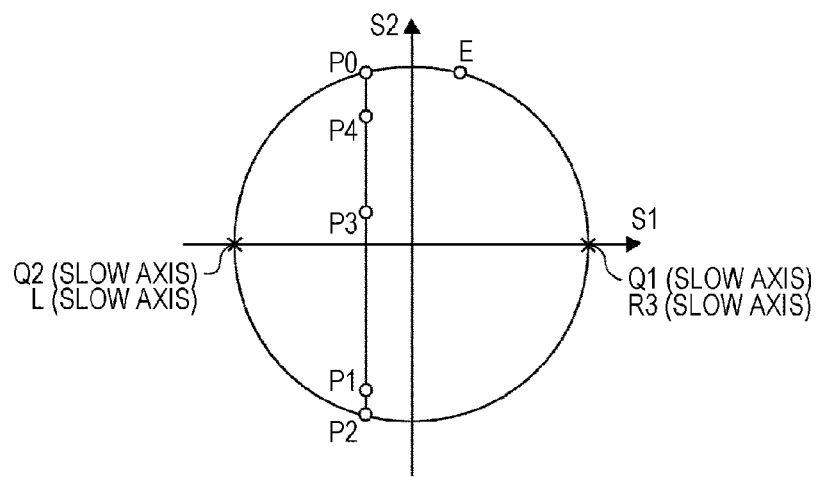
FIG. 9 is a diagram illustrating a way in which a polarization state of transmitted light is changed each time the transmitted light passes through each member regarding the circularly-polarized VA mode liquid crystal display device in FIG. 5 as viewed from the oblique direction with the azimuthal direction 45 degrees and polar 60 degrees by being projected on an S1-S2 plane of a Poincare sphere.

Birefringent layers to be employed for the present invention are not particularly restricted regarding material and optical performance, and there may be employed, for example, a drawn polymer film, a liquid crystal material of which the alignment has been fixed, a thin plate configured of an organic material, and so forth. A method for forming a birefringent layer is not particularly restricted, and according to design conditions, the most productive method may be selected as appropriate. In the case of a birefringent layer formed from a polymer film, a solvent cast method, a melt extruding method or the like may be employed for example. A method for forming multiple birefringent layers at the same time may be employed according to a co-extrusion method. As long as desired retardation is expressed, a birefringent layer may or may not be drawn. A drawing method is not particularly restricted, and there may be employed, for example, a special drawing method for performing drawing under working of contractile force of a heat shrinkable film, and so forth in addition to an inter-roll pulling drawing method, an inter-roll compression drawing method, a tenter transverse uniaxial drawing method, a diagonal drawing method, and a vertical and horizontal biaxial drawing method. Also, in the case of a birefringent layer formed from a liquid crystal material, there may be employed, for example, a method for fixing alignment by coating a liquid crystal material over a substrate film subjected to alignment processing. As long as desired retardation is expressed, there may be employed a method for performing no special alignment processing on a substrate film, or a method for performing processing to strip a liquid crystal material from the substrate film after fixing alignment and to transfer to another film. Further, there may be employed a method for not fixing alignment of a liquid crystal material. Also, in the case of a birefringent layer formed from a non-liquid crystal material as well, the same forming method as with a birefringent layer formed from a liquid crystal material may be employed. The first and second λ/4 plates are, in order to configure a circularly-polarizing plate, laminated so as to form a relative angle of approximate 45 degrees as to a polarizer, and accordingly, it is desirable regarding the first and second λ/4 plates to employ the diagonal drawing method for subjecting the plate to drawing alignment in the oblique direction as to a flow direction of a roll film. In particular, regarding a λ/4 plate having a smaller Nz coefficient, it is desirable to employ the diagonal drawing method. On the other hand, regarding a λ/4 plate having a larger Nz coefficient, it is desirable to employ the diagonal drawing method if possible, but in the case of not employing this method, another method may be selected from the above as appropriate. Hereinafter, description will be made further specifically according to the type of a birefringent layer.

(First-Type Birefringent Layer: First and Second λ/4 Plates)

As a first-type birefringent layer, there may suitably be employed a film including a material of which the intrinsic birefringence is positive as a component which has been subjected to drawing processing, or the like. Examples of a material of which the intrinsic birefringence is positive include polycarbonate, polysulfone, polyethersulfone, polyethylene terephthalate, polyethylene, polyvinyl alcohol, norbornene, triacetylcellulose, and diethyl cellulose.

(Second-Type Birefringent Layer)

As a second-type birefringent layer, there may suitably be employed a film including a material of which the intrinsic birefringence is negative as a component which has been subjected to drawing processing, a film including a material of which the intrinsic birefringence is positive as a component which has been subjected to drawing processing under working of contractile force of a heat shrinkable film, or the like. In particular, from a perspective of facilitation of a manufacturing method, a film including a material of which the intrinsic birefringence is negative as a component which has been subjected to drawing processing is desirable. Examples of a material of which the intrinsic birefringence is negative include a resin composition including an acrylic resin and a styrene resin, polystyrene, polyvinylnaphthalene, polyvinyl biphenyl, polyvinylpyridine, polymethyl methacrylate, polymethyl acrylate, N-substituted maleimide copolymer, polycarbonate having a fluorene skeleton, and triacetylcellulose (particularly having a small degree of acetylation). In particular, from the perspectives of optical property, productivity, and thermostability, a resin composition including an acrylic resin and a styrene resin is suitable. A method for manufacturing a film including such a resin component as a component has been disclosed in PTL 8, for example.

(Third-Type Birefringent Layer)

As a third-type birefringent layer, there may suitably be employed a film including a material of which the intrinsic birefringence is positive as a component which has been subjected to vertical and horizontal biaxial drawing processing, a film on which a liquid crystal material such as cholesteric (chiral nematic) liquid crystal or discotic liquid crystal or the like is coated, a film on which a non-liquid crystal material including polyimide or polyamide or the like is coated, or the like.

(Polarizer)

As polarizers, there may suitably be employed a polyvinyl alcohol (PVA) film in which an anisotropic material such as an iodine complex or the like having dichroism is absorbed and aligned, for example.

(Liquid Crystal Cell)

As long as black display is performed by aligning liquid crystal molecules within the liquid crystal layer in a manner perpendicular to a substrate face, any may be employed as a liquid crystal cell, and as display modes of such a liquid crystal cell, examples of a VA mode include Multi-domain VA (MVA) mode, Continuous Pinwheel Alignment (CPA) mode, Patterned VA (PVA) mode, Biased VA (BVA) mode, Reverse TN (RTN) mode, and In Plane Switching-VA (IPS-VA) mode. Also, as a liquid crystal cell driving format, there may be employed, in addition to the TFT format (active matrix format), the simple matrix format (passive matrix format), plasma address format, or the like. As the configuration of the liquid crystal cell, there may be employed a configuration wherein the liquid crystal layer is sandwiched between a pair of substrates each of which an electrode is formed, and display is performed by applying voltage between the electrodes, for example.

(Surface Treatment Layer)

As surface treatment layers, there are principally the following three layers. The first is a hard coat layer for wounding prevention, the second is an AG (Anti Glare) layer for providing glare proof, and the third is an antireflection layer for reducing surface reflection. Examples of the antireflection layer include an AR (Anti Reflection) layer having lower reflectivity, a LR (Low Reflection) layer having higher reflectivity than that of the AR layer, and a moth-eye layer having very low reflectivity. Note that a surface treatment layer is usually formed on a transparent protective film (e.g., TAC film). Also, multiple surface treatment layers may be laminated, and examples of such a laminated body include an AGLR layer where an AG layer is laminated on an LR layer, and an AGAR layer where an AG layer is laminated on an AR layer. The observation face side circularly-polarizing plate is manufactured with a protective film with a surface treatment layer, a polarizer, and one having a smaller Nz coefficient of the first and second λ/4 plates using the roll-to-roll lamination technology.

(Method for Measuring R, Rth, Nz Coefficient, nx, ny, and nz)

Measurement was performed using a polarimeter according to a dual retarder rotating method (manufactured by Axometrics, Inc., product name: Axo-scan). The in-plane retardation R was measured from the normal direction of a birefringent layer. The principal refractive indices nx, ny, and nz, thickness direction retardation Rth, and Nz coefficients were calculated by measuring retardation from the normal direction of a birefringent layer, and each oblique direction inclined −50 to 50 degrees from the normal direction, and using curve fitting according to a known refractive index ellipsoid method. The inclined azimuthal direction is taken as an azimuthal direction orthogonal to an in-plane slow axis. Also, the nx, ny, nz, Rxz, and Nz depend on mean refractive index=(nx+ny+nz)/3 to be provided as a curve fitting calculation condition, but are calculated by the mean refractive index of each birefringent layer being unified into 1.5. With regard to a birefringent layer of which the actual mean refractive index differs from 1.5 as well, conversion is made assuming that the mean refractive index is 1.5.

(Method for Measuring a Contrast Ratio-Viewing Angle Property of the Liquid Crystal Display Device)

Measurement was made using a view angle measuring device (manufactured by ELDIM, inc., product name: EZContrast160). A backlight mounted on a liquid crystal television manufactured by Sharp Corporation (product name: LC37-GH1) was employed as a light source. Intensities of white display and black display in the oblique direction with the azimuthal direction 45 degrees and polar 60 degrees were measured, and a ratio thereof was taken as CR (45, 60). Also, the intensities of white display and black display in the oblique direction with the azimuthal direction 0 degrees and polar 60 degrees were measured, and a ratio thereof was taken as CR (0, 60).

Hereinafter, the present invention will be described further in detail with reference to embodiments, but the present invention is not restricted to these embodiments alone.

Figure 16:
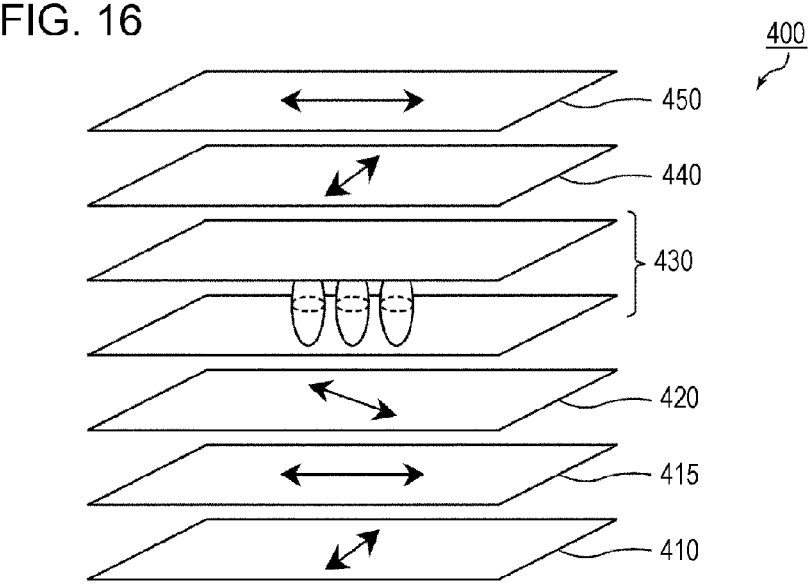
FIG. 16 is a perspective exploded view illustrating a configuration of a circularly-polarized VA mode liquid crystal display device including a second-type birefringent layer and excluding a third-type birefringent layer.

Liquid crystal display devices of Embodiments 1 to 7 according to the present invention and a liquid crystal display device of Comparative Example 2 are, as illustrated in FIG. 16, a circularly-polarized VA mode liquid crystal device 400 obtained by laminating a backlight (not illustrated), a first polarizer 410, a second-type birefringent layer 415, a first λ/4 plate (first-type birefringent layer) 420, a VA mode liquid crystal cell 430, a second λ/4 plate 440, and a second polarizer 450 in this order. Specifically, the liquid crystal display device 400 in FIG. 16 differs from the liquid crystal display device 300 in FIG. 10 in that the liquid crystal display device 400 does not include a third-type birefringent layer. With Embodiments 1 to 7, an Nz coefficient of the first λ/4 plate 420 and an Nz coefficient of the second λ/4 plate 440 mutually differ, but with Comparative Example 2, the Nz coefficient of the first λ/4 plate 420 and the Nz coefficient of the second λ/4 plate 440 are set to the same. Note that, in FIG. 16, arrows drawn in the first and second polarizers 410 and 450 represent the azimuthal directions of an absorption axis thereof, arrows drawn in the first and second λ/4 plates 420 and 440 represent the azimuthal directions of a slow axis thereof, an arrow drawn in the second-type birefringent layer 415 represents the azimuthal direction of a fast axis thereof, and an ellipsoid drawn in the VA mode liquid crystal cell 430 represents the shape of a refractive index ellipsoid thereof.

Figure 10:
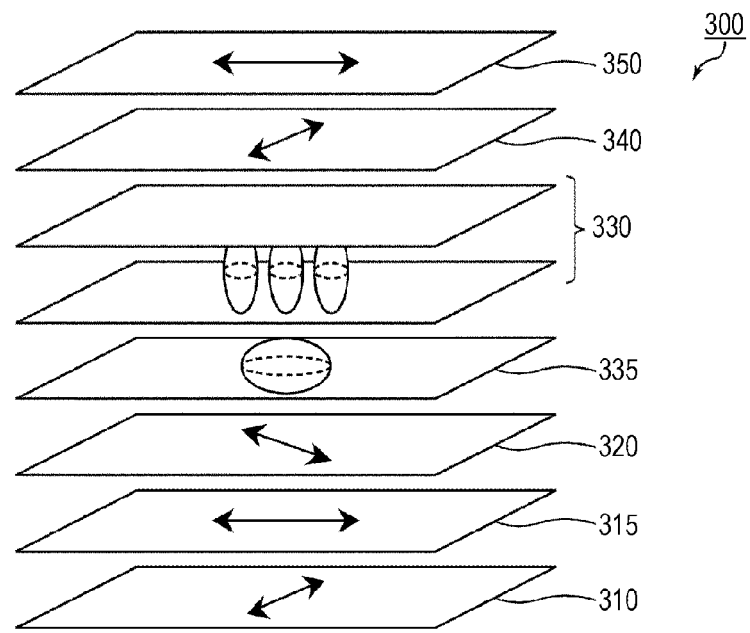
FIG. 10 is a perspective exploded view illustrating a configuration of a circularly-polarized VA mode liquid crystal display device including second-type and third-type birefringent layers.
Figure 11:
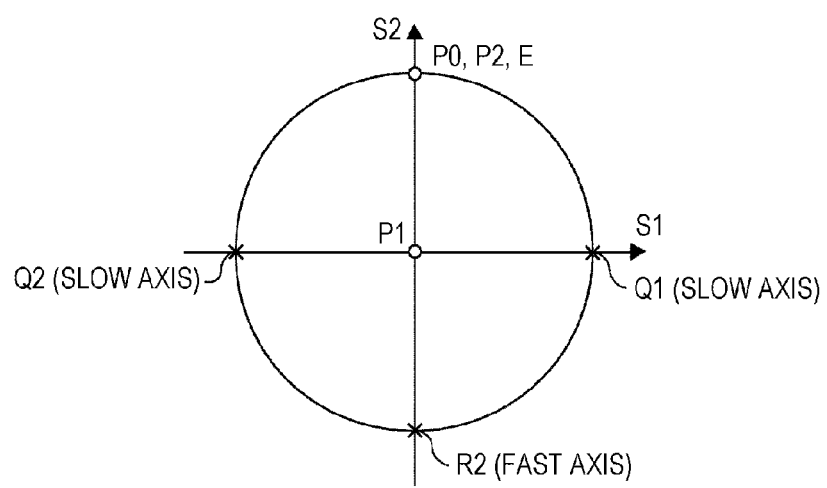
FIG. 11 is a diagram illustrating a way in which a polarization state of transmitted light is changed each time the transmitted light passes through each member regarding the circularly-polarized VA mode liquid crystal display device in FIG. 10 (mode with Nzq1=Nzq2=2.0, R3=−61 nm, Rlc=320 nm, Nz2=−0.30, R2=118 nm) as viewed from the front direction by being projected on an S1-S2 plane of a Poincare sphere.
Figure 12:
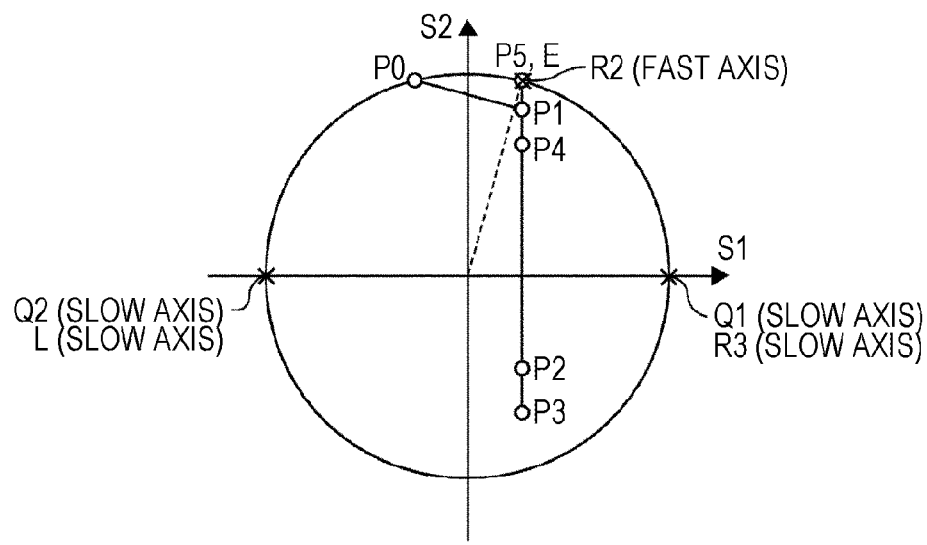
FIG. 12 is a diagram illustrating a way in which where a polarization state of transmitted light is changed each time the transmitted light passes through each member regarding the circularly-polarized VA mode liquid crystal display device in FIG. 10 (mode with Nzq1=Nzq2=2.0, R3=−61 nm, Rlc=320 nm, Nz2=−0.30, R2=118 nm) as viewed from the oblique direction with the azimuthal direction 45 degrees and polar 60 degrees by being projected on an S1-S2 plane of a Poincare sphere.
Figure 13:
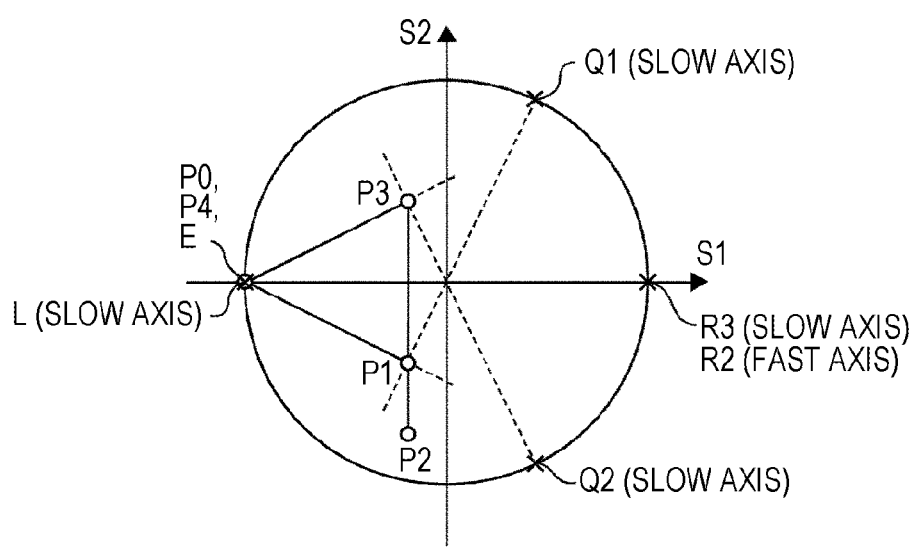
FIG. 13 is a diagram illustrating a way in which a polarization state of transmitted light is changed each time the transmitted light passes through each member regarding the circularly-polarized VA mode liquid crystal display device in FIG. 10 (mode with Nzq1=Nzq2=2.0, R3=−61 nm, Rlc=320 nm, Nz2=−0.30, R2=118 nm) as viewed from the oblique direction with the azimuthal direction 0 degrees and polar 60 degrees by being projected on an S1-S2 plane of a Poincare sphere.
Figure 14:
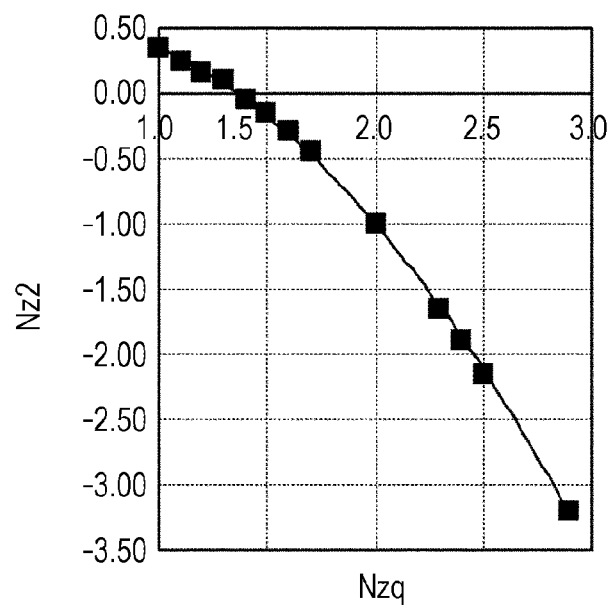
FIG. 14 is a graph illustrating a relation of a mean value Nzq of the Nz coefficients of first and second λ/4 plates, and an optimal value of the Nz coefficient Nz2 of a second-type birefringent layer regarding the circularly-polarized VA mode liquid crystal display device in FIG. 10.
Figure 15:
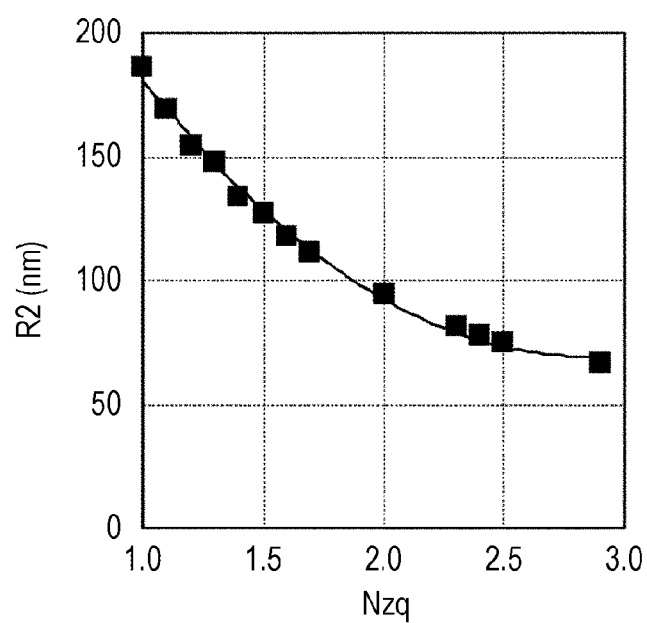
FIG. 15 is a graph illustrating a relation of a mean value Nzq of the Nz coefficients of first and second λ/4 plates, and an optimal value of the in-plane retardation R2 of a second-type birefringent layer regarding the circularly-polarized VA mode liquid crystal display device in FIG. 10.

Liquid crystal display devices of Embodiments 8 and 9 according to the present invention are, as illustrated in FIG. 10, a circularly-polarized VA mode liquid crystal display device 300 obtained by laminating a backlight (not illustrated), a first polarizer 310, a second-type birefringent layer 315, a first λ/4 plate (first-type birefringent layer) 320, a third-type birefringent layer 335, a VA mode liquid crystal cell 330, a second λ/4 plate 340, and a second polarizer 350 in this order. With Embodiments 8 and 9, an Nz coefficient of the first λ/4 plate 320, and an Nz coefficient of the second λ/4 plate 340 mutually differ.

Figure 17:
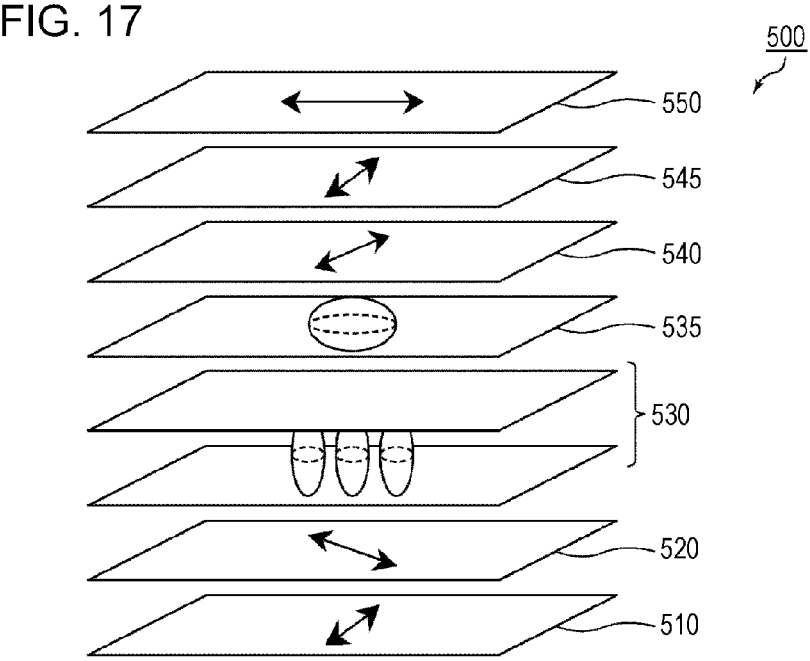
FIG. 17 is a perspective exploded view illustrating a configuration of a circularly-polarized VA mode liquid crystal display device including second-type and third-type birefringent layers.

A liquid crystal display device of Embodiment 10 according to the present invention is, as illustrated in FIG. 17, a circularly-polarized VA mode liquid crystal display device 500 obtained by laminating a backlight (not illustrated), a first polarizer 510, a first λ/4 plate (first-type birefringent layer) 520, a VA mode liquid crystal cell 530, a third-type birefringent layer 535, a second λ/4 plate 540, a second-type birefringent layer 545, and a second polarizer 550 in this order. With Embodiment 10, an Nz coefficient of the first λ/4 plate 520, and an Nz coefficient of the second λ/4 plate 540 mutually differ. Note that, in FIG. 17, arrows drawn in the first and second polarizers 510 and 550 represent the azimuthal directions of an absorption axis thereof, arrows drawn in the first and second λ/4 plates 520 and 540 represent the azimuthal directions of a slow axis thereof, an arrow drawn in the second-type birefringent layer 545 represents the azimuthal direction of a fast axis thereof, and an ellipsoid drawn in the VA mode liquid crystal cell 430 and third-type birefringent layer 535 represents the shape of a refractive index ellipsoid thereof.

A liquid crystal display device of Comparative Example 1 is a circularly-polarized VA mode liquid crystal display device obtained by laminating a backlight, a first polarizer, a first λ/4 plate (first-type birefringent layer), a VA mode liquid crystal cell, a second λ/4 plate, a second-type birefringent layer, and a second polarizer in this order. With Comparative Example 1, an Nz coefficient of the first λ/4 plate and an Nz coefficient of the second λ/4 plate are set to the same.

Regarding the polarizers, birefringent layers, and liquid crystal cell of each example, material names, axial angles, in-plane retardation R, thickness direction retardation Rth or Rlc, and Nz coefficients are as illustrated in Tables 4 and 5. In the tables, the axis of each birefringent layer is defined with an azimuthal direction angle of an in-plane slow axis, and the axis of a polarizer is defined with an azimuthal direction angle of an absorption axis. Note that, with regard to the second-type birefringent layer, the in-plane fast axis is important in design, but in the tables, in the same way as with other birefringent layers, the axis of the second-type birefringent layer is defined with an azimuthal direction angle of the in-plane slow axis. The in-plane fast axis of the second-type birefringent layer is orthogonal to the in-plane slow axis of the second-type birefringent layer. Also, in the tables, the material name of each birefringent layer is illustrated with the following abbreviations.

NB: norbornene
ChLC: cholesteric liquid crystal
PI: polyimide
TAC: triacetylcellulose
A: resin composition including an acrylic resin and a styrene resin Further, in the tables, an Nz coefficient mean value is defined as a mean value of an Nz coefficient of the first λ/4 plate and an Nz coefficient of the second λ/4 plate.

(Evaluation Results)

A contrast ratio-viewing angle property of the liquid crystal display device of each example was measured, and CR (0, 60) and CR (45, 60) were organized in the following Tables 4 and 5. Any of the liquid crystal devices of Embodiments 1 to 10 according to the present invention has the same CR (0, 60) and CR (45, 60) as CR (0, 60) and CR (45, 60) of Comparative Examples 1 and 2, and has, with a visual evaluation as well, the same excellent contrast ratio-viewing angle property as with Comparative Examples 1 and 2.

Also, with Embodiments 1 to 10, the Nz coefficient of the first λ/4 plate and the Nz coefficient of the second λ/4 plate mutually differ, and accordingly, a circularly-polarizing plate including the first λ/4 plate having a smaller Nz coefficient excels in productivity, whereby reduction in costs is realizable. In particular, a general-purpose λ/4 plate manufactured by diagonal drawing as a λ/4 plate of which the Nz coefficient has been adjusted to approximate 1.6 can be also used, and accordingly, an advantage in productivity of an embodiment including a λ/4 plate of which the Nz coefficient has been adjusted to approximate 1.6 is significantly large.

With Embodiments 1 to 9, the first λ/4 plate having a smaller Nz coefficient is disposed on the observation face side of the liquid crystal cell, whereby there can be improved productivity of a polarizing plate on the observation face side (second polarizer side) which is apt to increase in number of varieties to meet demand for difference in surface processing.

Also, with Embodiments 1 to 9, the second-type birefringent layer (and third-type birefringent layer) is disposed on the rear face side (backlight side) of the liquid crystal cell, and Embodiments 1 to 9 have higher productivity than Embodiment 10 since the configuration of the polarizing plated on the observation face side (second polarizer side) is simpler than that in Embodiment 10.

Embodiments 8 and 9 are higher in retardation of the liquid crystal cell as compared to Embodiment 5, but the retardation of the liquid crystal cell is compensated using the third-type birefringent layer. Therefore, it is understood that the same optical compensation as with Embodiment 5 is practically performed. In this manner, according to the liquid crystal display device of the present invention, it is understood that the retardations of multiple liquid crystal cells can be handled just by changing the retardation of the third-type birefringent layer. Therefore, there is no need at all to change the configuration of the polarizing plate on the observation face side which is apt to increase in number of varieties.

With the liquid crystal devices of Comparative Examples 1 and 2, the Nz coefficients of the first and second λ/4 plates are both relatively large, which may make it difficult to manufacture the first and second λ/4 plates.

As described above, according to the liquid crystal display device of the present invention, various advantages in manufacturing can be obtained while securing a very excellent viewing angle property.

TABLE 4

| | | MATERIAL NAME | AXIAL ANGLE [DEGREE] | RETARDATION [nm] R | Rth OR Rlc | Nz CO-EFFICIENT | Nz CO-EFFICIENT MEAN VALUE | EVALUATION RESULTS CR (45, 60) | CR (0, 60) |
|---|---|---|---|---|---|---|---|---|---|
| | OPTICAL MEMBER NAME | | | | | | | | |
| EMBODIMENT 1 | SECOND POLARIZING ELEMENT | | 0 | | | | 2.30 | 56 | 177 |
| | SECOND λ/4 PLATE | NB | 45 | 138 | | 1.98 | | | |
| | VA MODE LIQUID CRYSTAL CELL | | | | 310 | | | | |
| | FIRST λ/4 PLATE | NB | 135 | 138 | | 2.62 | | | |
| | SECOND-TYPE BIREFRINGENT LAYER | A | 90 | 78 | | −1.58 | | | |
| | FIRST POLARIZING ELEMENT | | 90 | | | | | | |
| EMBODIMENT 2 | SECOND POLARIZING ELEMENT | | 0 | | | | 2.30 | 56 | 177 |
| | SECOND λ/4 PLATE | NB | 45 | 138 | | 1.65 | | | |
| | VA MODE LIQUID CRYSTAL CELL | | | | 310 | | | | |
| | FIRST λ/4 PLATE | NB | 135 | 138 | | 2.95 | | | |
| | SECOND-TYPE BIREFRINGENT LAYER | A | 90 | 78 | | −1.58 | | | |
| | FIRST POLARIZING ELEMENT | | 90 | | | | | | |
| EMBODIMENT 3 | SECOND POLARIZING ELEMENT | | 0 | | | | 2.31 | 55 | 177 |
| | SECOND λ/4 PLATE | NB | 45 | 138 | | 1.38 | | | |
| | VA MODE LIQUID CRYSTAL CELL | | | | 310 | | | | |
| | FIRST λ/4 PLATE | NB | 135 | 138 | | 3.29 | | | |
| | SECOND-TYPE BIREFRINGENT LAYER | A | 90 | 78 | | −1.58 | | | |
| | FIRST POLARIZING ELEMENT | | 90 | | | | | | |
| EMBODIMENT 4 | SECOND POLARIZING ELEMENT | | 0 | | | | 2.38 | 55 | 175 |
| | SECOND λ/4 PLATE | NB | 45 | 138 | | 1.01 | | | |
| | VA MODE LIQUID CRYSTAL CELL | | | | 310 | | | | |
| | FIRST λ/4 PLATE | NB | 135 | 138 | | 3.65 | | | |
| | SECOND-TYPE BIREFRINGENT LAYER | A | 90 | 78 | | −1.58 | | | |
| | FIRST POLARIZING ELEMENT | | 90 | | | | | | |
| EMBODIMENT 5 | SECOND POLARIZING ELEMENT | | 0 | | | | 2.05 | 52 | 176 |
| | SECOND λ/4 PLATE | NB | 45 | 138 | | 1.65 | | | |
| | VA MODE LIQUID CRYSTAL CELL | | | | 310 | | | | |
| | FIRST λ/4 PLATE | NB | 135 | 138 | | 2.45 | | | |
| | SECOND-TYPE BIREFRINGENT LAYER | A | 90 | 105 | | −0.45 | | | |
| | FIRST POLARIZING ELEMENT | | 90 | | | | | | |
| EMBODIMENT 6 | SECOND POLARIZING ELEMENT | | 0 | | | | 2.02 | 52 | 177 |
| | SECOND λ/4 PLATE | NB | 45 | 138 | | 1.38 | | | |
| | VA MODE LIQUID CRYSTAL CELL | | | | 310 | | | | |
| | FIRST λ/4 PLATE | NB | 135 | 138 | | 2.66 | | | |
| | SECOND-TYPE BIREFRINGENT LAYER | A | 90 | 105 | | −0.45 | | | |
| | FIRST POLARIZING ELEMENT | | 90 | | | | | | |
| EMBODIMENT 7 | SECOND POLARIZING ELEMENT | | 0 | | | | 2.01 | 50 | 176 |
| | SECOND λ/4 PLATE | NB | 45 | 138 | | 1.00 | | | |
| | VA MODE LIQUID CRYSTAL CELL | | | | 310 | | | | |
| | FIRST λ/4 PLATE | NB | 135 | 138 | | 3.02 | | | |
| | SECOND-TYPE BIREFRINGENT LAYER | A | 90 | 105 | | −0.45 | | | |
| | FIRST POLARIZING ELEMENT | | 90 | | | | | | |
| EMBODIMENT 8 | SECOND POLARIZING ELEMENT | | 0 | | | | 2.05 | 50 | 174 |
| | SECOND λ/4 PLATE | NB | 45 | 138 | | 1.65 | | | |
| | VA MODE LIQUID CRYSTAL CELL | | | | 360 | | | | |
| | THIRD-TYPE BIREFRINGENT LAYER | TAC | | 2 | | −52 | | | |
| | FIRST λ/4 PLATE | NB | 135 | 138 | | 2.45 | | | |
| | SECOND-TYPE BIREFRINGENT LAYER | A | 90 | 105 | | −0.45 | | | |
| | FIRST POLARIZING ELEMENT | | 90 | | | | | | |
| EMBODIMENT 9 | SECOND POLARIZING ELEMENT | | 0 | | | | 2.05 | 51 | 175 |
| | SECOND λ/4 PLATE | NB | 45 | 138 | | 1.65 | | | |
| | VA MODE LIQUID CRYSTAL CELL | | | | 400 | | | | |
| | THIRD-TYPE BIREFRINGENT LAYER | NB | | 1 | | −88 | | | |
| | FIRST λ/4 PLATE | NB | 135 | 138 | | 2.45 | | | |
| | SECOND-TYPE BIREFRINGENT LAYER | A | 90 | 105 | | −0.45 | | | |
| | FIRST POLARIZING ELEMENT | | 90 | | | | | | |

TABLE 4-continued

| OPTICAL MEMBER NAME | MATERIAL NAME | AXIAL ANGLE [DEGREE] | RETARDATION R [nm] | Rth OR Rlc [nm] | Nz CO-EFFICIENT | Nz CO-EFFICIENT MEAN VALUE | EVALUATION RESULTS CR (45, 60) | CR (0, 60) |
|---|---|---|---|---|---|---|---|---|
| EMBODIMENT 10 SECOND POLARIZING ELEMENT | | 0 | | | | 2.05 | 51 | 175 |
| SECOND-TYPE BIREFRINGENT LAYER | A | 0 | 105 | | −0.45 | | | |
| SECOND λ/4 PLATE | NB | 45 | 138 | | 2.45 | | | |
| THIRD-TYPE BIREFRINGENT LAYER | NB | | 1 | −88 | | | | |
| VA MODE LIQUID CRYSTAL CELL | | | | 400 | | | | |
| FIRST λ/4 PLATE | NB | 135 | 138 | | 1.65 | | | |
| FIRST POLARIZING ELEMENT | | 90 | | | | | | |

TABLE 5

| OPTICAL MEMBER NAME | MATERIAL NAME | AXIAL ANGLE [DEGREE] | RETARDATION R [nm] | Rth OR Rlc [nm] | Nz COEFFICIENT | Nz COEFFICIENT MEAN VALUE | EVALUATION RESULTS CR (45, 60) | CR (0, 60) |
|---|---|---|---|---|---|---|---|---|
| COMPARATIVE EXAMPLE 1 SECOND POLARIZING ELEMENT | | 0 | | | | 2.31 | 55 | 178 |
| SECOND-TYPE BIREFRINGENT LAYER | A | 0 | 78 | | −1.58 | | | |
| SECOND λ/4 PLATE | NB | 45 | 138 | | 2.31 | | | |
| VA MODE LIQUID CRYSTAL CELL | | | | 310 | | | | |
| FIRST λ/4 PLATE | NB | 135 | 138 | | 2.31 | | | |
| FIRST POLARIZING ELEMENT | | 90 | | | | | | |
| COMPARATIVE EXAMPLE 2 SECOND POLARIZING ELEMENT | | 0 | | | | 2.00 | 53 | 177 |
| SECOND λ/4 PLATE | NB | 45 | 138 | | 2.00 | | | |
| VA MODE LIQUID CRYSTAL CELL | | | | 310 | | | | |
| FIRST λ/4 PLATE | NB | 135 | 138 | | 2.00 | | | |
| SECOND-TYPE BIREFRINGENT LAYER | A | 90 | 105 | | −0.45 | | | |
| FIRST POLARIZING ELEMENT | | 90 | | | | | | |

Note that the liquid crystal display device of each embodiment includes a circularly-polarizing plate configured of a combination of a linearly-polarizing plate (polarizer) and a λ/4 plate on both sides of the liquid crystal cell, and accordingly, any of the liquid crystal display devices performs display in the circularly-polarized VA mode. The circularly-polarized VA mode is effective for improvement of a contrast ratio since an antireflection effect can be obtained in addition to a transmittance improvement effect. An antireflection function according to the circularly-polarized AV mode is to prevent light which is input into a liquid crystal display device from the circumference of the liquid crystal display device once and is reflected within the liquid crystal display device, that is, reflected light according to so-called internal reflection to be emitted outside the liquid crystal display device by working of the circularly-polarizing plate. Therefore, according to the circularly-polarized AV mode, light reflected at a surface such as black matrix, wiring, an electrode, or the like within the liquid crystal cell is not readily emitted outside the liquid crystal display device, and particularly, the contrast ratio of the liquid crystal display device can be prevented from deterioration in a situation wherein the circumference is bright (bright environment).

On the other hand, examples of reflected light which deteriorates the contrast ratio of the liquid crystal display device in a bright environment include, in addition to reflected light according to the above internal reflection, light to be reflected at the surface of the liquid crystal display device without being input to the liquid crystal display device from the circumference of the liquid crystal display device, that is, reflected light according to so-called internal reflection. With the liquid crystal display device in the circularly-polarized VA mode, reflected light due to internal reflection is suppressed, and consequently, the amount of reflected light due to surface reflection has a marked effect on visibility of a display screen. Accordingly, a very high contrast ratio is obtained in a bright environment by subjecting the liquid crystal display device in the circularly-polarized VA mode to a countermeasure to reduce reflected light due to surface reflection, and one viewing a display screen can recognize marked improvement in display quality.

Figure 18:
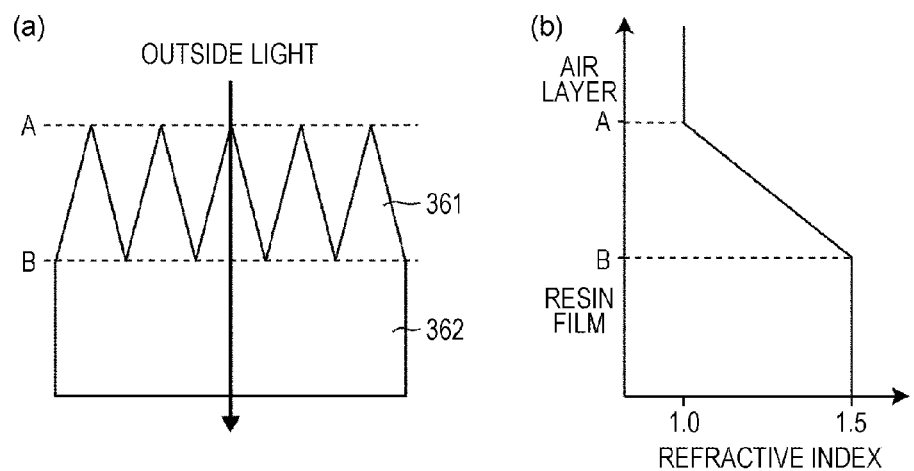
FIG. 18 (a) illustrates an enlarged schematic view of a moth-eye film, and (b) is an explanatory diagram illustrating change in a refractive index in an interface between the moth-eye film and an air layer.

Examples of an antireflection film (layer) to be used for suppression of surface reflection include an antireflection film formed by laminating multiple films having a different refractive index, and an antireflection film where a fine protrusion and a fine hollow are formed on the surface. In particular, a moth-eye film which is one kind of the latter antireflection film has a configuration wherein a great number of smaller protrusions than the wavelength of visible light (380 to 780 nm) are provided on the surface, and a very excellent effect can be exhibited in suppression of surface reflection. As illustrated in (a) in FIG. 18, light input to a moth-eye film reaches a film base material portion 362 via a fine protrusion 361 provided to the surface, and accordingly, a region between the air layer and the film base material portion where the protrusion and the air layer are mixed (region between A-B in the drawing) can be regarded as a region having an intermediate refractive index between the refractive index of a material making up the film (around 1.5 in the case of a resin film) and the refractive index of the air (1.0). The refractive index of this region consecutively gradually increases, as illustrated in (b) in FIG. 18, in response to change in a volume ratio between the protrusion and the air layer, from the refractive index of the air which is in contact with the surface of the film to the refractive index of the material making up the film within shorter distance than the wavelength of visible light. As a result thereof, light input to the moth-eye film does not recognize an interface between the air and the film as an interface having a different refractive index, and reflection of light caused on the interface can significantly be suppressed. According to the moth-eye film, the surface reflectance of visible light can be suppressed to around 0.15%.

Figure 19:
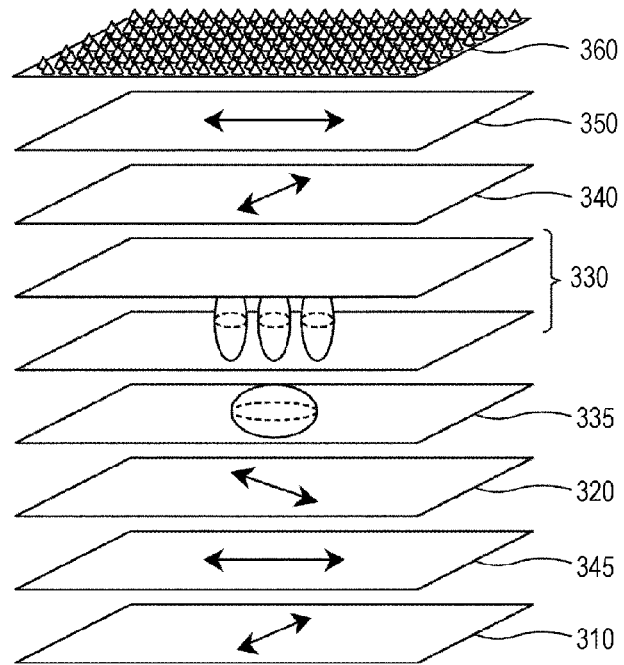
FIG. 19 is a perspective exploded view illustrating a configuration of the circularly-polarized VA mode liquid crystal display device in FIG. 10 to which a moth-eye film has been added.

The moth-eye film can exhibits an effect to reduce the reflectance by being disposed on an interface having a different refractive index, but with the configuration illustrated in FIG. 10 for example, internal reflection caused in an inner portion than the second polarizer 350 can be suppressed by the circularly-polarizing plate configured of a combination of the second polarizer 350 and second λ/4 plate 340. Accordingly, for example, in the event of adding a moth-eye film to the configuration in FIG. 10, the moth-eye film is disposed on a more display face side (observation face side) than the second polarizer 350 as with the moth-eye film 360 illustrated in FIG. 19. In the event that a member such as a protective plate or the like is disposed in a more display face side than the second polarizer 350, and there are multiple interfaces, a moth-eye film may be provided for each interface, and it is desirable to dispose a moth-eye film on at least a face exposing outside the liquid crystal display device.

Specific examples of a moth-eye film include a resin film where a great number of protrusions having a generally cone shape with height of around 200 nm are formed on the surface with distance between peaks of around 200 nm.

Examples of a moth-eye film manufacturing method include technology wherein irregularities with a nanometer size (1 to 1000 nm) engraved in a metal mold are pressed against a resin material coated on a substrate to transfer a shape, that is, so-called nanoimprint technology. Examples of a method to harden a resin material in nanoimprint technology include thermal nanoimprint technology, and UV nanoimprint technology. The UV nanoimprint technology is to form a thin ultraviolet curing resin film on a transparent substrate, to press a metal mold on this thin film, and then to irradiate a ultraviolet ray thereupon, thereby forming a thin film having a moth-eye configuration of a reversal shape of the metal mold on the transparent substrate.

In order to manufacture thin films having a moth-eye configuration at a low price in large quantities using the nanoimprint technology, it is suitable to employ roll-to-roll processing instead of batch processing. According to the roll-to-roll processing, thin films having a moth-eye configuration can consecutively be manufactured using a metal mold roll. Examples of such a metal mold roll include a metal mold roll wherein hollows with a nanometer size are formed on the outer circumferential face of a ground column-shaped or cylindrical aluminum tube using an anodic oxidation method. According to the anodic oxidation method, hollows with a nanometer size can be formed generally uniformly at random, a seamless moth-eye configuration suitable for consecutive production can be formed on the surface of a metal mold roll.

Each mode in the above embodiments may be combined as appropriate without departing from essence of the present invention. Further, a mode obtained by mutually combining two or more preferred modes is also one preferred mode.

The present application claims priority based on the Paris Convention and laws in countries relevant to the national/regional phase, with Japanese Patent Application No. 2011-080126 filed on Mar. 31, 2011 as a basis. As for the contents of this application, entirety thereof is incorporated by reference in the present application.

REFERENCE SIGNS LIST 100 circularly-polarized VA mode liquid crystal display device
110 first polarizer
111 absorption axis of first polarizer
120 first λc/4 plate
121 slow axis of first λ/4 plate
130 VA mode liquid crystal cell
140 second λ/4 plate
141 slow axis of second λ/4 plate
150 second polarizer
151 absorption axis of second polarizer
200 circularly-polarized VA mode liquid crystal display device
210 first polarizer
220 first λ/4 plate
230 VA mode liquid crystal cell
235 third-type birefringent layer
240 second λ/4 plate
250 second polarizer
300 circularly-polarized VA mode liquid crystal display device
310 first polarizer
315 second-type birefringent layer
320 first λ/4 plate
330 VA mode liquid crystal cell
335 third-type birefringent layer
340 second λ/4 plate
350 second polarizer
360 moth-eye film
361 protrusion
362 film base portion
400 circularly-polarized VA mode liquid crystal display device
410 first polarizer
415 second-type birefringent layer 420 first λ/4 plate
430 VA mode liquid crystal cell
440 second λ/4 plate
450 second polarizer
500 circularly-polarized VA mode liquid crystal display device
510 first polarizer
520 first λ/4 plate
530 VA mode liquid crystal cell
535 third-type birefringent layer
540 second λ/4 plate
545 second-type birefringent layer
550 second polarizer

The invention claimed is:

1. A liquid crystal display device comprising, when defining that a birefringent layer satisfying a relation of nx>ny≥nz is a first-type birefringent layer, and a birefringent layer satisfying a relation of nx<ny≤nz is a a second-type birefringent layer:
   a first polarizer;
   a second-type birefringent layer;
   a first first-type birefringent layer of which the in-plane retardation has been adjusted to λ/4;
   a liquid crystal cell having a pair of substrates which mutually face, and having a liquid crystal layer sandwiched between this lair of substrates;
   a second first-type birefringent layer having an Nz coefficient different from an Nz coefficient of the first first-type birefringent layer of which the in-plane retardation has been adjusted to λ/4; and
   a second polarizer in this order,
   wherein an in-plane slow axis of the first first-type birefringent layer forms an angle of generally 45 degrees as to an absorption axis of the first polarizer;
   wherein an in-plane slow axis of the second first-type birefringent layer is generally orthogonal to the in-plane slow axis of the first first-type birefringent layer;
   wherein an absorption axis of the second polarizer is generally orthogonal to the absorption axis of the first polarizer;
   wherein an in-plane fast axis of the second-type birefringent layer is generally orthogonal to the absorption axis of the first polarizer;
   wherein black display is performed by aligning liquid crystal molecules within the liquid crystal layer in a manner generally perpendicular to the substrate surfaces;
   wherein one Nz coefficient of the first first-type birefringent layer and the second first-type birefringent layer is equal to or greater than 2; and
   wherein the other Nz coefficient of the first first-type birefringent layer and the second first-type birefringent layer is equal to or greater than 1 but less than 2.

2. The liquid crystal display device according to claim 1, wherein of the first and second first-type birefringent layers, one having a greater Nz coefficient is disposed on the rear face side of the liquid crystal cell.

3. The liquid crystal display device according to claim 1, wherein the second-type birefringent layer is disposed on the rear face side of the liquid crystal cell.

4. The liquid crystal display device according to claim 3, wherein the Nz coefficient of the first first-type birefringent layer is greater than the Nz coefficient of the second first-type birefringent layer;
   and wherein the second-type birefringent layer and the first first-type birefringent layer are disposed on the rear face side of the liquid crystal cell.

5. The liquid crystal display device according to claim 1, further comprising:
   a surface treatment layer on the observation face side of the second polarizer, wherein the Nz coefficient of the first first-type birefringent layer is greater than the Nz coefficient of the second first-type birefringent layer.

6. A liquid crystal display device comprising, when defining that a birefringent layer satisfying a relation of nx>ny≥nz is a first-type birefringent layer, and a birefringent layer satisfying a relation of nx<ny≤is a second-type birefringent layer:
   a first polarizer;
   a second-type birefringent layer;
   a first first-type birefringent layer of which the in-plane retardation has been adjusted to λ/4;
   a liquid crystal cell having a pair of substrates which mutually face, and having a liquid crystal layer sandwiched between this pair of substrates;
   a second first-type birefringent layer having Nz coefficient different from an Nz, coefficient of the first first-type birefringent layer, of which the in-plane retardation has been adjusted to λ/4; and
   a second polarizer in this order,
   wherein an in-plane slow axis of the first first-type birefringent layer forms an angle of generally 45 degrees as to an absorption axis of the first polarizer;
   wherein an in-plane slow axis of the second first-type birefringent layer is generally orthogonal to the in-plane slow axis of the first first-type birefringent layer;
   wherein an absorption axis of the second polarizer is generally orthogonal to the absorption axis of the first polarizer;
   wherein an in-plane fast axis of the second-type birefringent layer is generally orthogonal to the absorption axis of the first polarizer;
   wherein black display is performed by aligning liquid crystal molecules within the liquid crystal layer in a manner generally perpendicular to the substrate surfaces;
   when defining that a birefringent layer satisfying a relation of nx≈ny≥nz is a third-type birefringent layer, at least one third-type birefringent layer is provided at least between the first first-type birefringent layer and the liquid crystal cell or between the liquid crystal cell and the second first-type birefringent layer
   and wherein the following Expressions (1) to (3) are satisfied when defining that a mean value of the Nz coefficients of the first and second first-type birefringent layers is Nzq, thickness direction retardation at the time of black display of the liquid crystal cell is Rlc, and summation of the thickness direction retardation of at least the one third-type birefringent layer is R3

$$1.0 \leq Nzq \leq 2.9 \tag{1}$$

$$(169 \text{ nm} \times Nzq - 81 \text{ nm}) - 50 \text{ nm} \leq Rlc + R3 \tag{2}$$

$$Rlc + R3 \leq (169 \text{ nm} \times Nzq - 81 \text{ nm}) + 50 \text{ nm} \tag{3}.$$

7. The liquid crystal display device according to claim 6 satisfying the following Expressions (4) to (7) when defining that an Nz coefficient of the second-type birefringent layer is Nz2, and in-plane retardation thereof is R2

$$(-0.63 \times Nzq^2 + 0.56 \times Nzq + 0.40) - 0.80 \leq Nz2 \tag{4}$$

$$Nz2 \leq (-0.63 \times Nzq^2 + 0.56 \times Nzq + 0.40) + 0.80 \tag{5}$$

$$(43 \text{ nm} \times Nzq^2 - 226 \text{ nm} \times Nzq + 370 \text{ nm}) - 50 \text{ nm} \leq R2 \tag{6}$$

$$R2 \leq (43 \text{ nm} \times Nzq^2 - 226 \text{ nm} \times Nzq + 370 \text{ nm}) + 50 \text{ nm} \tag{7}.$$

8. The liquid crystal display device according to claim 7 satisfying $1.40 \leq Nzq$.

9. A liquid crystal display device comprising, when, defining that a birefringent layer satisfying a relation of nx>ny≥nz is a first-type birefringent layer, and a birefringent layer satisfying a relation of nx<ny≤nz is a second-type birefringent layer:
- a first polarizer;
- a second-type birefringent layer;
- a first first-type birefringent layer of which the in-plane retardation has been adjusted to λ/4;
- a liquid crystal cell having a pair of substrates which mutually face, and having a liquid crystal layer sandwiched between this pair of substrates;
- a second first-type birefringent layer having an Nz coefficient different from an Nz coefficient of the first first-type birefringent layer, of which the in-plane retardation has been adjusted to λ/4; and
- a second polarizer in this order,
- wherein an in-plane slow axis of the first first-type birefringent layer forms an angle of generally 45 degrees as to an absorption axis of the first polarizer;
- wherein an in-plane slow axis of the second first-type birefringent layer is generally orthogonal to the in-plane slow axis of the first first-type birefringent layer;
- wherein an absorption axis of the second polarizer is generally orthogonal to the absorption axis of the first polarizer;
- wherein an in-plane fast axis of the second-type birefringent layer is generally orthogonal to the absorption axis of the first polarizer;
- wherein black display is performed by aligning liquid crystal molecules within the liquid crystal layer in a manner generally perpendicular to the substrate surfaces;
- wherein the liquid crystal display device satisfies Nzq<1.40, satisfies −0.80≤Nz2≤0, and also satisfies 88 nm≤R2≤188 nm when defining that a mean value of the Nz coefficients of the first and second first-type birefringent layers is Nzq, an Nz coefficient of the second-type birefringent layer is Nz2, and in-plane retardation thereof is R2;
- when defining that a birefringent layer satisfying a relation of nx≈ny≥nz is a third-type birefringent layer:
- at least one third-type birefringent layer at least between the first first-type birefringent layer and the liquid crystal cell or between the liquid crystal cell and the second first-type birefringent layer.

10. A liquid crystal display device comprising, when defining that a birefringent layer satisfying a relation of nx>ny≥nz is a first-type birefringent layer, and a birefringent layer satisfying a relation of nx <ny≤is a second-type birefringent layer:
- a first polarizer;
- a second-type birefringent layer;
- a first first-type birefringent layer of which the in-plane retardation has been adjusted to λ/4;
- a liquid crystal cell having a pair of substrates which mutually face, and having a liquid crystal layer sandwiched between this pair of substrates;
- a second first-type birefringent layer having an Nz coefficient different from an Nz coefficient of the first first-type birefringent layer, of which the in-plane retardation has been adjusted to λ/4; and
- a second polarizer in this order,
- wherein an in-plane slow axis of the first first-type birefringent layer forms an angle of generally 45 degrees as to an absorption axis of the first polarizer;
- wherein an in-plane slow axis of the second first-type birefringent layer is generally orthogonal to the in-plane slow axis of the first first-type birefringent layer;
- wherein an absorption axis of the second polarizer is generally orthogonal to the absorption axis of the first polarizer;
- wherein an in-plane fast axis of the second-type birefringent layer is generally orthogonal to the absorption axis of the first polarizer;
- wherein black display is performed by aligning liquid crystal molecules within the liquid crystal layer in a manner generally perpendicular to the substrate surfaces;
- when defining that a birefringent layer satisfying a relation of nx≈ny≥nz is a third-type birefringent layer, no third-type birefringent layer is provided between the first first-type birefringent layer and the liquid crystal cell and between the liquid crystal cell and the second first-type birefringent layer;
- when defining that a mean value of the Nz coefficients of the first and second first-type birefringent layers is Nzq, and thickness direction retardation at the time of black display of the liquid crystal cell is Rlc, satisfying the following Expressions (1), (8) and (9)

$$1.0 \leq Nzq \leq 2.9 \ldots \quad (1)$$

$$(169 \text{ nm} \times Nzq - 81 \text{ nm}) - 50 \text{ nm} \leq Rlc \ldots \quad (8)$$

$$Rlc \leq (169 \text{ nm} \times Nzq - 81 \text{ nm}) + 50 \text{ nm} \ldots \quad (9).$$

* * * * *